US012625242B2

(12) United States Patent
Wang et al.

(10) Patent No.: US 12,625,242 B2
(45) Date of Patent: May 12, 2026

(54) POSITIONING BASED ON INTER-PACKET ARRIVAL TIME

(71) Applicant: QUALCOMM Incorporated, San Diego, CA (US)

(72) Inventors: Xiaojie Wang, Hillsborough, NJ (US); Mohammad Tarek Fahim, San Diego, CA (US); Jing Sun, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 415 days.

(21) Appl. No.: 18/322,875

(22) Filed: May 24, 2023

(65) Prior Publication Data

US 2024/0393445 A1     Nov. 28, 2024

(51) Int. Cl.
*G01S 11/02*          (2010.01)

(52) U.S. Cl.
CPC ..................................... *G01S 11/02* (2013.01)

(58) Field of Classification Search
CPC ....................................................... G01S 11/02
See application file for complete search history.

(56) References Cited

U.S. PATENT DOCUMENTS 5,491,468 A * 2/1996 Everett ................ G06K 7/0008
                                                        340/870.31
12,326,511 B2 * 6/2025 Rappaport ............. G01C 19/00

2007/0115137 A1 * 5/2007 Lyon ..................... G01S 13/767
                                                        340/8.1
2008/0284600 A1 * 11/2008 Drzaic .................... G01S 13/75
                                                        340/572.1
2010/0244576 A1 * 9/2010 Hillan .................. G06K 7/0008
                                                        343/745
2011/0078092 A1 * 3/2011 Kim ..................... B60L 53/305
                                                        320/109
2020/0393555 A1 12/2020 Kletsov et al.

FOREIGN PATENT DOCUMENTS

WO      WO-2022200673 A1     9/2022

OTHER PUBLICATIONS

Fabbri D., et al., "Micropower Design of an Energy Autonomous RF Tag for UWB Localization Applications", 2018 IEEE International Symposium on Circuits and Systems (ISCAS), IEEE, May 27, 2018, 5 Pages, XP033434799, pp. 1-3, Figures 1-4.
International Search Report and Written Opinion—PCT/US2024/029913—ISA/EPO—Sep. 12, 2025.

* cited by examiner

*Primary Examiner* — Robert W Hodge
*Assistant Examiner* — Helena H Seraydaryan
(74) *Attorney, Agent, or Firm* — Muncy, Geissler, Olds & Lowe, P.C.

(57)          ABSTRACT

Disclosed are techniques for wireless communication. In an aspect, a radio frequency identification (RFID) station may receive a first packet from an RFID tag at a first arrival time. The RFID station may receive a second packet from the RFID tag at a second arrival time after the first arrival time. The RFID station may estimate a distance between the RFID station and the RFID tag based on an inter-packet arrival time between the first packet and the second packet, the inter-packet arrival time being based on a time difference between the first arrival time and the second arrival time.

13 Claims, 16 Drawing Sheets

1000

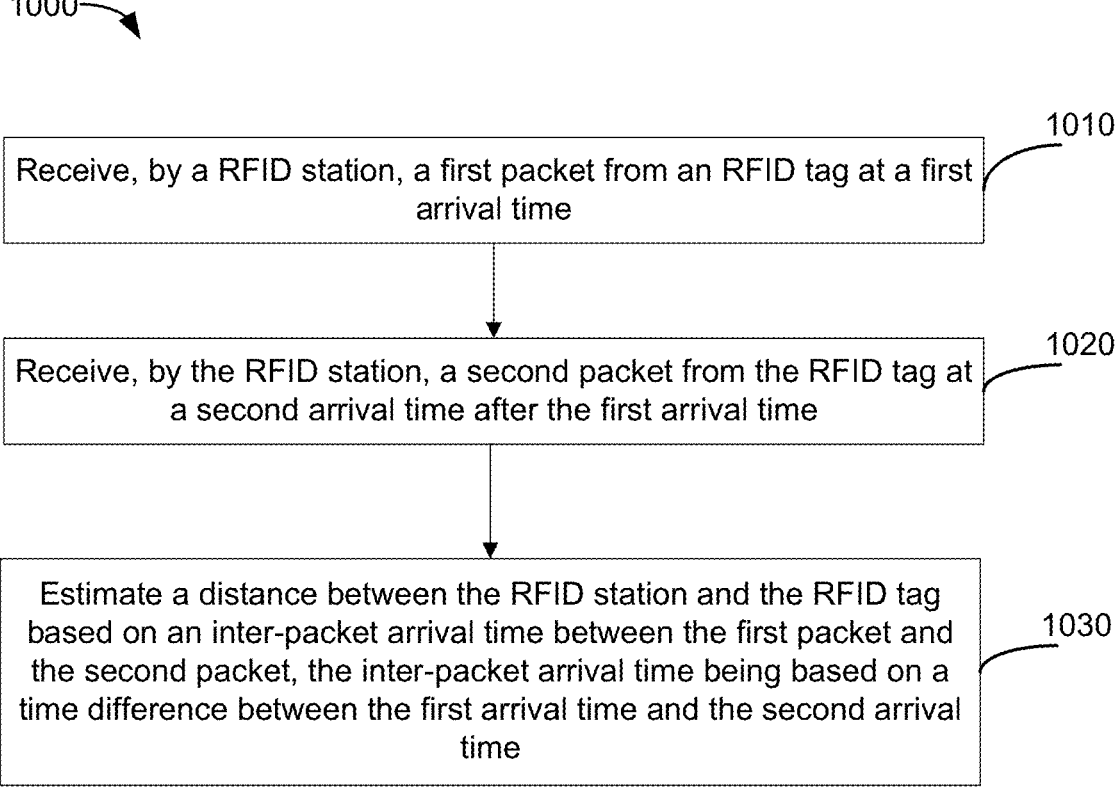

1010

Receive, by a RFID station, a first packet from an RFID tag at a first arrival time

1020

Receive, by the RFID station, a second packet from the RFID tag at a second arrival time after the first arrival time

1030

Estimate a distance between the RFID station and the RFID tag based on an inter-packet arrival time between the first packet and the second packet, the inter-packet arrival time being based on a time difference between the first arrival time and the second arrival time

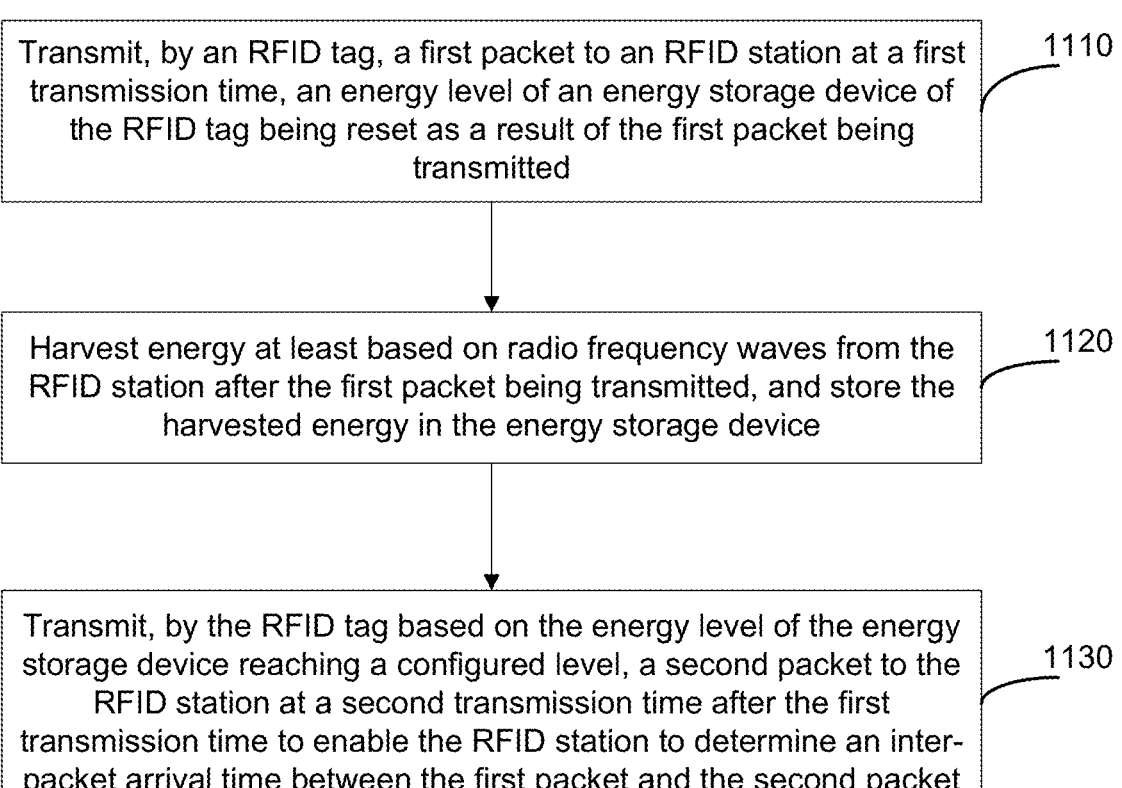

Transmit, by an RFID tag, a first packet to an RFID station at a first transmission time, an energy level of an energy storage device of the RFID tag being reset as a result of the first packet being transmitted          1110

Harvest energy at least based on radio frequency waves from the RFID station after the first packet being transmitted, and store the harvested energy in the energy storage device          1120

Transmit, by the RFID tag based on the energy level of the energy storage device reaching a configured level, a second packet to the RFID station at a second transmission time after the first transmission time to enable the RFID station to determine an inter-packet arrival time between the first packet and the second packet          1130

FIG. 11

POSITIONING BASED ON INTER-PACKET ARRIVAL TIME

BACKGROUND OF THE DISCLOSURE

1. Field of the Disclosure

Aspects of the disclosure relate generally to wireless communications.

2. Description of the Related Art

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (e.g., Long Term Evolution (LTE) or WiMax). There are presently many different types of wireless communication systems in use, including cellular and personal communications service (PCS) systems. Examples of known cellular systems include the cellular analog advanced mobile phone system (AMPS), and digital cellular systems based on code division multiple access (CDMA), frequency division multiple access (FDMA), time division multiple access (TDMA), the Global System for Mobile communications (GSM), etc.

A fifth generation (5G) wireless standard, referred to as New Radio (NR), enables higher data transfer speeds, greater numbers of connections, and better coverage, among other improvements. The 5G standard, according to the Next Generation Mobile Networks Alliance, is designed to provide higher data rates as compared to previous standards, more accurate positioning (e.g., based on reference signals for positioning (RS-P), such as downlink, uplink, or sidelink positioning reference signals (PRS)), and other technical enhancements. These enhancements, as well as the use of higher frequency bands, advances in PRS processes and technology, and high-density deployments for 5G, enable highly accurate 5G-based positioning.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method of operating a radio frequency identification (RFID) station includes receiving a first packet from an RFID tag at a first arrival time; receiving a second packet from the RFID tag at a second arrival time after the first arrival time; and estimating a distance between the RFID station and the RFID tag based on an inter-packet arrival time between the first packet and the second packet, the inter-packet arrival time being based on a time difference between the first arrival time and the second arrival time.

In an aspect, a method of operating a radio frequency identification (RFID) tag includes transmitting a first packet to an RFID station at a first transmission time, an energy level of an energy storage device of the RFID tag being reset as a result of the first packet being transmitted; harvesting energy at least based on radio frequency waves from the RFID station after the first packet being transmitted, and storing the harvested energy in the energy storage device; and transmitting, based on the energy level of the energy storage device reaching a configured level, a second packet to the RFID station at a second transmission time after the first transmission time to enable the RFID station to determine an inter-packet arrival time between the first packet and the second packet.

In an aspect, a radio frequency identification (RFID) station includes at least one memory; at least one transceiver; and at least one processor communicatively coupled to the at least one memory and the at least one transceiver, the at least one processor configured to: receive, via the at least one transceiver, a first packet from an RFID tag at a first arrival time; receive, via the at least one transceiver, a second packet from the RFID tag at a second arrival time after the first arrival time; and estimate a distance between the RFID station and the RFID tag based on an inter-packet arrival time between the first packet and the second packet, the inter-packet arrival time being based on a time difference between the first arrival time and the second arrival time.

In an aspect, a radio frequency identification (RFID) tag includes at least one memory; at least one transceiver; and at least one processor communicatively coupled to the at least one memory and the at least one transceiver, the at least one processor configured to: transmit, via the at least one transceiver, a first packet to an RFID station at a first transmission time, an energy level of an energy storage device of the RFID tag being reset as a result of the first packet being transmitted; harvest energy at least based on radio frequency waves from the RFID station after the first packet being transmitted, and storing the harvested energy in the energy storage device; and transmit, via the at least one transceiver and based on the energy level of the energy storage device reaching a configured level, a second packet to the RFID station at a second transmission time after the first transmission time to enable the RFID station to determine an inter-packet arrival time between the first packet and the second packet.

In an aspect, a radio frequency identification (RFID) station includes means for receiving a first packet from an RFID tag at a first arrival time; means for receiving a second packet from the RFID tag at a second arrival time after the first arrival time; and means for estimating a distance between the RFID station and the RFID tag based on an inter-packet arrival time between the first packet and the second packet, the inter-packet arrival time being based on a time difference between the first arrival time and the second arrival time.

In an aspect, a radio frequency identification (RFID) tag includes means for transmitting a first packet to an RFID station at a first transmission time, an energy level of an energy storage device of the RFID tag being reset as a result of the first packet being transmitted; means for harvesting energy at least based on radio frequency waves from the RFID station after the first packet being transmitted, and storing the harvested energy in the energy storage device; and means for transmitting, based on the energy level of the energy storage device reaching a configured level, a second packet to the RFID station at a second transmission time after the first transmission time to enable the RFID station to determine an inter-packet arrival time between the first packet and the second packet.

In an aspect, a non-transitory computer-readable medium stores computer-executable instructions that, when executed by a radio frequency identification (RFID) station, cause the RFID station to: receive a first packet from an RFID tag at a first arrival time; receive a second packet from the RFID tag at a second arrival time after the first arrival time; and estimate a distance between the RFID station and the RFID tag based on an inter-packet arrival time between the first packet and the second packet, the inter-packet arrival time being based on a time difference between the first arrival time and the second arrival time.

In an aspect, a non-transitory computer-readable medium stores computer-executable instructions that, when executed by a radio frequency identification (RFID) tag, cause the RFID tag to: transmit a first packet to an RFID station at a first transmission time, an energy level of an energy storage device of the RFID tag being reset as a result of the first packet being transmitted; harvest energy at least based on radio frequency waves from the RFID station after the first packet being transmitted, and storing the harvested energy in the energy storage device; and transmit, based on the energy level of the energy storage device reaching a configured level, a second packet to the RFID station at a second transmission time after the first transmission time to enable the RFID station to determine an inter-packet arrival time between the first packet and the second packet.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

FIG. 10 illustrates an example method of operating an RFID station, according to aspects of the disclosure.

FIG. 11 illustrates an example method of operating an RFID tag, according to aspects of the disclosure.

DETAILED DESCRIPTION

Figure 1:
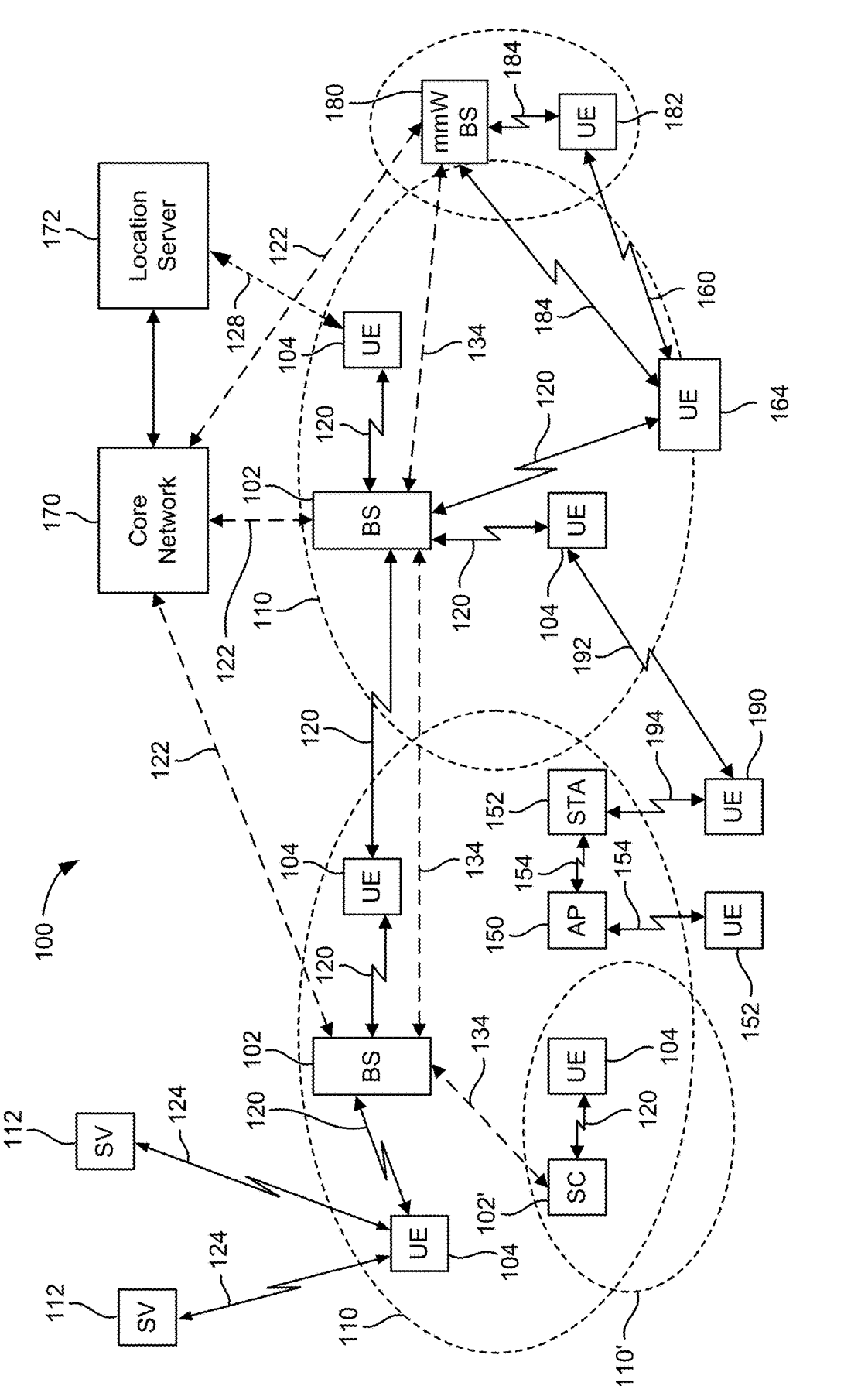
FIG. 1 illustrates an example wireless communications system, according to aspects of the disclosure.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

Various aspects relate generally to a positioning estimation procedure that is based on an inter-packet arrival time. Some aspects more specifically relate to a radio frequency identification (RFID) tag that may harvest energy based on radio frequency waves from an RFID station after transmitting a first packet, and may transmit a second packet after the first packet based on whether an energy level of an energy storage device of the RFID tag reaching a configured level. In some examples, the time difference between the first packet and the second packet may correspond to the received signal strength at the RFID tag, which may in turn correspond to a distance between the RFID tag and the RFID station.

Particular aspects of the subject matter described in this disclosure can be implemented to realize one or more of the following potential advantages. In some examples, the described techniques can be used to perform a positioning estimation procedure that is based on an inter-packet arrival time. In some examples, the described techniques can simplify the hardware and/or processing complexity requirements at an RFID tag. Accordingly, the RFID station may determine a distance between the RFID tag and the RFID station without imposing significant loading to the RFID tag and without significant processing latency. Also, the RFID tag may engage in a positioning procedure without excessive hardware and/or processing demands, without significant processing latency, and hence without incurring excessive power consumption.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-read-able storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" are not intended to be specific or otherwise limited to any particular radio access technology (RAT), unless otherwise noted. In general, a UE may be any wireless communication device (e.g., a mobile phone, router, tablet computer, laptop computer, consumer asset locating device, wearable (e.g., smartwatch, glasses, aug-mented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or "UT," a "mobile device," a "mobile terminal," a "mobile station," or varia-tions thereof. Generally, UEs can communicate with a core network via a RAN, and through the core network the UEs can be connected with external networks such as the Internet and with other UEs. Of course, other mechanisms of con-necting to the core network and/or the Internet are also possible for the UEs, such as over wired access networks, wireless local area network (WLAN) networks (e.g., based on the Institute of Electrical and Electronics Engineers (IEEE) 802.11 specification, etc.) and so on.

A base station may operate according to one of several RATs in communication with UEs depending on the network in which it is deployed, and may be alternatively referred to as an access point (AP), a network node, a NodeB, an evolved NodeB (eNB), a next generation eNB (ng-eNB), a New Radio (NR) Node B (also referred to as a gNB or gNodeB), etc. A base station may be used primarily to support wireless access by UEs, including supporting data, voice, and/or signaling connections for the supported UEs. In some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an uplink/reverse or downlink/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell (or several cell sectors) of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the mea-surement report from the UE and a neighbor base station whose reference radio frequency (RF) signals the UE is measuring. Because a TRP is the point from which a base station transmits and receives wireless signals, as used herein, references to transmission from or reception at a base station are to be understood as referring to a particular TRP of the base station.

In some implementations that support positioning of UEs, a base station may not support wireless access by UEs (e.g., may not support data, voice, and/or signaling connections for UEs), but may instead transmit reference signals to UEs to be measured by the UEs, and/or may receive and measure signals transmitted by the UEs. Such a base station may be referred to as a positioning beacon (e.g., when transmitting signals to UEs) and/or as a location measurement unit (e.g., when receiving and measuring signals from UEs).

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each trans-mitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal" or simply a "signal" where it is clear from the context that the term "signal" refers to a wireless signal or an RF signal.

FIG. 1 illustrates an example wireless communications system 100, according to aspects of the disclosure. The wireless communications system 100 (which may also be referred to as a wireless wide area network (WWAN)) may include various base stations 102 (labeled "BS") and various UEs 104. The base stations 102 may include macro cell base stations (high power cellular base stations) and/or small cell base stations (low power cellular base stations). In an aspect, the macro cell base stations may include eNBs and/or ng-eNBs where the wireless communications system 100 corresponds to an LTE network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or a 5G core (5GC)) through backhaul links 122, and through the core network 170 to one or more location servers 172 (e.g., a location management function (LMF) or a secure user plane location (SUPL) location platform (SLP)). The location server(s) 172 may be part of core network 170 or may be external to core network 170. A location server 172 may be integrated with a base station 102. A UE 104 may communicate with a location server 172 directly or indirectly. For example, a UE 104 may communicate with a location server 172 via the base station 102 that is currently serving that UE 104. A UE 104 may also communicate with a location server 172 through another path, such as via an application server (not shown), via another network, such as via a wireless local area network (WLAN) access point (AP) (e.g., AP 150 described below), and so on. For signaling purposes, communication between a UE 104 and a location server 172 may be represented as an indirect connection (e.g., through the core network 170, etc.) or a direct connection (e.g., as shown via direct connection 128), with the intervening nodes (if any) omitted from a signaling diagram for clarity.

In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/5GC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each geographic coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), an enhanced cell identifier (ECI), a virtual cell identifier (VCI), a cell global identifier (CGI), etc.) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both of the logical communication entity and the base station that supports it, depending on the context. In addition, because a TRP is typically the physical transmission point of a cell, the terms "cell" and "TRP" may be used interchangeably. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' (labeled "SC" for "small cell") may have a geographic coverage area 110' that substantially overlaps with the geographic coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for uplink).

The wireless communications system 100 may further include a wireless local area network (WLAN) access point (AP) 150 in communication with WLAN stations (STAs) 152 via communication links 154 in an unlicensed frequency spectrum (e.g., 5 GHZ). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE/5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MULTEFIRE®.

The wireless communications system 100 may further include a millimeter wave (mmW) base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHZ with a wavelength of 100 millimeters. The super high frequency (SHF) band extends between 3 GHz and 30 GHZ, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while cancelling to suppress radiation in undesired directions.

Transmit beams may be quasi-co-located, meaning that they appear to the receiver (e.g., a UE) as having the same parameters, regardless of whether or not the transmitting antennas of the network node themselves are physically co-located. In NR, there are four types of quasi-co-location (QCL) relations. Specifically, a QCL relation of a given type means that certain parameters about a second reference RF signal on a second beam can be derived from information about a source reference RF signal on a source beam. Thus, if the source reference RF signal is QCL Type A, the receiver can use the source reference RF signal to estimate the Doppler shift, Doppler spread, average delay, and delay spread of a second reference RF signal transmitted on the same channel. If the source reference RF signal is QCL Type B, the receiver can use the source reference RF signal to estimate the Doppler shift and Doppler spread of a second reference RF signal transmitted on the same channel. If the source reference RF signal is QCL Type C, the receiver can use the source reference RF signal to estimate the Doppler shift and average delay of a second reference RF signal transmitted on the same channel. If the source reference RF signal is QCL Type D, the receiver can use the source reference RF signal to estimate the spatial receive parameter of a second reference RF signal transmitted on the same channel.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

Transmit and receive beams may be spatially related. A spatial relation means that parameters for a second beam (e.g., a transmit or receive beam) for a second reference signal can be derived from information about a first beam (e.g., a receive beam or a transmit beam) for a first reference signal. For example, a UE may use a particular receive beam to receive a reference downlink reference signal (e.g., synchronization signal block (SSB)) from a base station. The UE can then form a transmit beam for sending an uplink reference signal (e.g., sounding reference signal (SRS)) to that base station based on the parameters of the receive beam.

Note that a "downlink" beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

The electromagnetic spectrum is often subdivided, based on frequency/wavelength, into various classes, bands, channels, etc. In 5G NR two initial operating bands have been identified as frequency range designations FR1 (410 MHZ-7.125 GHZ) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHZ-300 GHZ) which is identified by the INTERNATIONAL TELECOMMUNICATION UNION® as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHZ-71 GHZ), FR4 (52.6 GHZ-114.25 GHZ), and FR5 (114.25 GHZ-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHZ, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

The wireless communications system 100 may further include a UE 164 that may communicate with a macro cell base station 102 over a communication link 120 and/or the mmW base station 180 over a mmW communication link 184. For example, the macro cell base station 102 may support a PCell and one or more SCells for the UE 164 and the mmW base station 180 may support one or more SCells for the UE 164.

In some cases, the UE 164 and the UE 182 may be capable of sidelink communication. Sidelink-capable UEs (SL-UEs) may communicate with base stations 102 over communication links 120 using the Uu interface (i.e., the air interface between a UE and a base station). SL-UEs (e.g., UE 164, UE 182) may also communicate directly with each other over a wireless sidelink 160 using the PC5 interface (i.e., the air interface between sidelink-capable UEs). A wireless sidelink (or just "sidelink") is an adaptation of the core cellular (e.g., LTE, NR) standard that allows direct communication between two or more UEs without the communication needing to go through a base station. Sidelink communication may be unicast or multicast, and may be used for device-to-device (D2D) media-sharing, vehicle-to-vehicle (V2V) communication, vehicle-to-everything (V2X) communication (e.g., cellular V2X (cV2X) communication, enhanced V2X (cV2X) communication, etc.), emergency rescue applications, etc. One or more of a group of SL-UEs utilizing sidelink communications may be within the geographic coverage area 110 of a base station 102. Other SL-UEs in such a group may be outside the geographic coverage area 110 of a base station 102 or be otherwise unable to receive transmissions from a base station 102. In some cases, groups of SL-UEs communicating via sidelink communications may utilize a one-to-many (1:M) system in which each SL-UE transmits to every other SL-UE in the group. In some cases, a base station 102 facilitates the scheduling of resources for sidelink communications. In other cases, sidelink communications are carried out between SL-UEs without the involvement of a base station 102.

In an aspect, the sidelink 160 may operate over a wireless communication medium of interest, which may be shared with other wireless communications between other vehicles and/or infrastructure access points, as well as other RATs. A "medium" may be composed of one or more time, frequency, and/or space communication resources (e.g., encompassing one or more channels across one or more carriers) associated with wireless communication between one or more transmitter/receiver pairs. In an aspect, the medium of interest may correspond to at least a portion of an unlicensed frequency band shared among various RATs. Although different licensed frequency bands have been reserved for certain communication systems (e.g., by a government entity such as the Federal Communications Commission (FCC) in the United States), these systems, in particular those employing small cell access points, have recently extended operation into unlicensed frequency bands such as the Unlicensed National Information Infrastructure (U-NII) band used by wireless local area network (WLAN) technologies, most notably IEEE 802.11x WLAN technologies generally referred to as "Wi-Fi." Example systems of this type include different variants of CDMA systems, TDMA systems, FDMA systems, orthogonal FDMA (OFDMA) systems, single-carrier FDMA (SC-FDMA) systems, and so on.

Note that although FIG. 1 only illustrates two of the UEs as SL-UEs (i.e., UEs 164 and 182), any of the illustrated UEs may be SL-UEs. Further, although only UE 182 was described as being capable of beamforming, any of the illustrated UEs, including UE 164, may be capable of beamforming. Where SL-UEs are capable of beamforming, they may beamform towards each other (i.e., towards other SL-UEs), towards other UEs (e.g., UEs 104), towards base stations (e.g., base stations 102, 180, small cell 102', access point 150), etc. Thus, in some cases, UEs 164 and 182 may utilize beamforming over sidelink 160.

In the example of FIG. 1, any of the illustrated UEs (shown in FIG. 1 as a single UE 104 for simplicity) may receive signals 124 from one or more Earth orbiting space vehicles (SVs) 112 (e.g., satellites). In an aspect, the SVs 112 may be part of a satellite positioning system that a UE 104 can use as an independent source of location information. A satellite positioning system typically includes a system of transmitters (e.g., SVs 112) positioned to enable receivers (e.g., UEs 104) to determine their location on or above the Earth based, at least in part, on positioning signals (e.g., signals 124) received from the transmitters. Such a transmitter typically transmits a signal marked with a repeating pseudo-random noise (PN) code of a set number of chips. While typically located in SVs 112, transmitters may sometimes be located on ground-based control stations, base stations 102, and/or other UEs 104. A UE 104 may include one or more dedicated receivers specifically designed to receive signals 124 for deriving geo location information from the SVs 112.

In a satellite positioning system, the use of signals 124 can be augmented by various satellite-based augmentation systems (SBAS) that may be associated with or otherwise enabled for use with one or more global and/or regional navigation satellite systems. For example an SBAS may include an augmentation system(s) that provides integrity information, differential corrections, etc., such as the Wide Area Augmentation System (WAAS), the European Geostationary Navigation Overlay Service (EGNOS), the Multifunctional Satellite Augmentation System (MSAS), the Global Positioning System (GPS) Aided Geo Augmented Navigation or GPS and Geo Augmented Navigation system (GAGAN), and/or the like. Thus, as used herein, a satellite positioning system may include any combination of one or more global and/or regional navigation satellites associated with such one or more satellite positioning systems.

In an aspect. SVs 112 may additionally or alternatively be part of one or more non-terrestrial networks (NTNs). In an NTN, an SV 112 is connected to an earth station (also referred to as a ground station, NTN gateway, or gateway), which in turn is connected to an element in a 5G network, such as a modified base station 102 (without a terrestrial antenna) or a network node in a 5GC. This element would in turn provide access to other elements in the 5G network and ultimately to entities external to the 5G network, such as Internet web servers and other user devices. In that way, a UE 104 may receive communication signals (e.g., signals 124) from an SV 112 instead of, or in addition to, communication signals from a terrestrial base station 102.

The wireless communications system 100 may further include one or more UEs, such as UE 190, that connects indirectly to one or more communication networks via one or more device-to-device (D2D) peer-to-peer (P2P) links (referred to as "sidelinks"). In the example of FIG. 1. UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WI-FI DIRECT®, BLUETOOTH®, and so on.

Figure 2A:
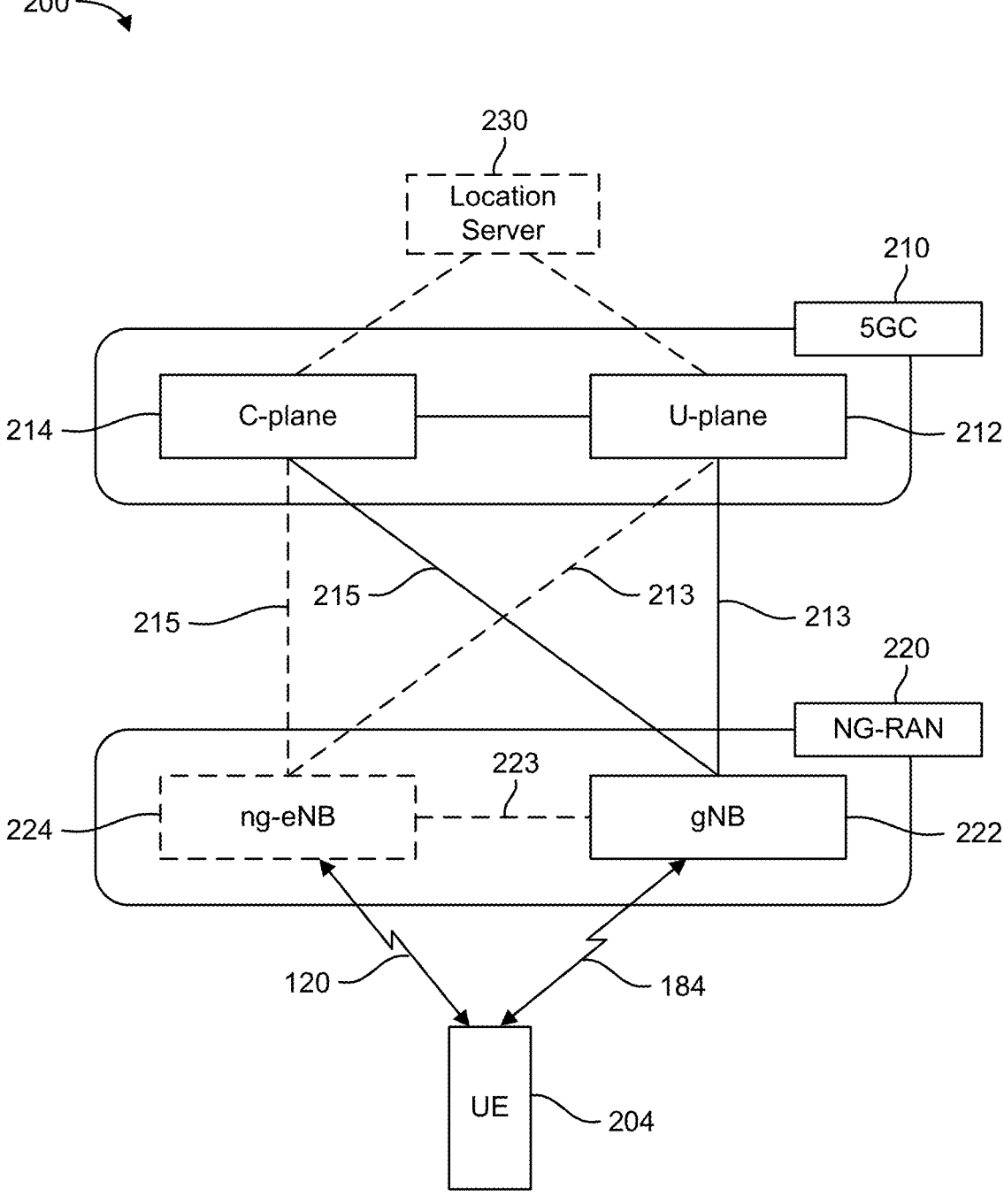
FIGS. 2A, 2B, and 2C illustrate example wireless network structures, according to aspects of the disclosure.

FIG. 2A illustrates an example wireless network structure 200. For example, a 5GC 210 (also referred to as a Next Generation Core (NGC)) can be viewed functionally as control plane (C-plane) functions 214 (e.g., UE registration, authentication, network access, gateway selection, etc.) and user plane (U-plane) functions 212, (e.g., UE gateway function, access to data networks, IP routing, etc.) which operate cooperatively to form the core network. User plane interface (NG-U) 213 and control plane interface (NG-C) 215 connect the gNB 222 to the 5GC 210 and specifically to the user plane functions 212 and control plane functions 214, respectively. In an additional configuration, an ng-eNB 224 may also be connected to the 5GC 210 via NG-C 215 to the control plane functions 214 and NG-U 213 to user plane functions 212. Further, ng-eNB 224 may directly communicate with gNB 222 via a backhaul connection 223. In some configurations, a Next Generation RAN (NG-RAN) 220 may have one or more gNBs 222, while other configurations include one or more of both ng-eNBs 224 and gNBs 222. Either (or both) gNB 222 or ng-eNB 224 may communicate with one or more UEs 204 (e.g., any of the UEs described herein).

Another optional aspect may include a location server 230, which may be in communication with the 5GC 210 to provide location assistance for UE(s) 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, 5GC 210, and/or via the Internet (not illustrated). Further, the location server 230 may be integrated into a component of the core network, or alternatively may be external to the core network (e.g., a third party server, such as an original equipment manufacturer (OEM) server or service server).

Figure 2B:
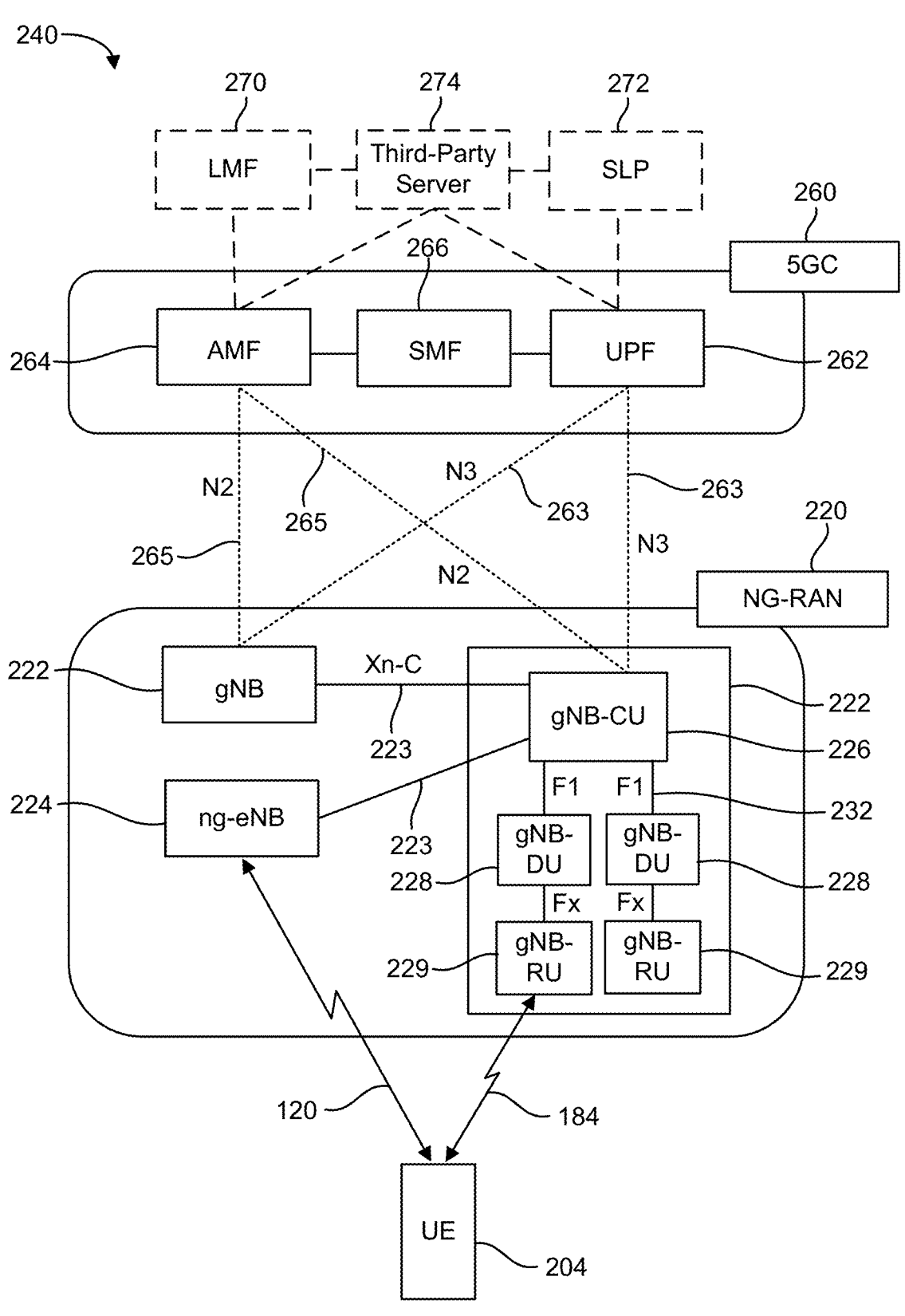

FIG. 2B illustrates another example wireless network structure 240. A 5GC 260 (which may correspond to 5GC 210 in FIG. 2A) can be viewed functionally as control plane functions, provided by an access and mobility management function (AMF) 264, and user plane functions, provided by a user plane function (UPF) 262, which operate cooperatively to form the core network (i.e., 5GC 260). The functions of the AMF 264 include registration management, connection management, reachability management, mobility management, lawful interception, transport for session management (SM) messages between one or more UEs 204 (e.g., any of the UEs described herein) and a session management function (SMF) 266, transparent proxy services for routing SM messages, access authentication and access authorization, transport for short message service (SMS) messages between the UE 204 and the short message service function (SMSF) (not shown), and security anchor functionality (SEAF). The AMF 264 also interacts with an authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF 264 retrieves the security material from the AUSF. The functions of the AMF 264 also include security context management (SCM). The SCM receives a key from the SEAF that it uses to derive access-network specific keys. The functionality of the AMF 264 also includes location services management for regulatory services, transport for location services messages between the UE 204 and a location management function (LMF) 270 (which acts as a location server 230), transport for location services messages between the NG-RAN 220 and the LMF 270, evolved packet system (EPS) bearer identifier allocation for interworking with the EPS, and UE 204 mobility event notification. In addition, the AMF 264 also supports functionalities for non-3GPP® (Third Generation Partnership Project) access networks.

Functions of the UPF 262 include acting as an anchor point for intra/inter-RAT mobility (when applicable), acting as an external protocol data unit (PDU) session point of interconnect to a data network (not shown), providing packet routing and forwarding, packet inspection, user plane policy rule enforcement (e.g., gating, redirection, traffic steering), lawful interception (user plane collection), traffic usage reporting, quality of service (QOS) handling for the user plane (e.g., uplink/downlink rate enforcement, reflective QoS marking in the downlink), uplink traffic verification (service data flow (SDF) to QoS flow mapping), transport level packet marking in the uplink and downlink, downlink packet buffering and downlink data notification triggering, and sending and forwarding of one or more "end markers" to the source RAN node. The UPF 262 may also support transfer of location services messages over a user plane between the UE 204 and a location server, such as an SLP 272.

The functions of the SMF 266 include session management, UE Internet protocol (IP) address allocation and management, selection and control of user plane functions, configuration of traffic steering at the UPF 262 to route traffic to the proper destination, control of part of policy enforcement and QoS, and downlink data notification. The interface over which the SMF 266 communicates with the AMF 264 is referred to as the N11 interface.

Another optional aspect may include an LMF 270, which may be in communication with the 5GC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, 5GC 260, and/or via the Internet (not illustrated). The SLP 272 may support similar functions to the LMF 270, but whereas the LMF 270 may communicate with the AMF 264, NG-RAN 220, and UEs 204 over a control plane (e.g., using interfaces and protocols intended to convey signaling messages and not voice or data), the SLP 272 may communicate with UEs 204 and external clients (e.g., third-party server 274) over a user plane (e.g., using protocols intended to carry voice and/or data like the transmission control protocol (TCP) and/or IP).

Yet another optional aspect may include a third-party server 274, which may be in communication with the LMF 270, the SLP 272, the 5GC 260 (e.g., via the AMF 264 and/or the UPF 262), the NG-RAN 220, and/or the UE 204 to obtain location information (e.g., a location estimate) for the UE 204. As such, in some cases, the third-party server 274 may be referred to as a location services (LCS) client or an external client. The third-party server 274 can be implemented as a plurality of separate servers (e.g., physically separate servers, different software modules on a single server, different software modules spread across multiple physical servers, etc.), or alternately may each correspond to a single server.

User plane interface 263 and control plane interface 265 connect the 5GC 260, and specifically the UPF 262 and AMF 264, respectively, to one or more gNBs 222 and/or ng-eNBs 224 in the NG-RAN 220. The interface between gNB(s) 222 and/or ng-eNB(s) 224 and the AMF 264 is referred to as the "N2" interface, and the interface between gNB(s) 222 and/or ng-eNB(s) 224 and the UPF 262 is referred to as the "N3" interface. The gNB(s) 222 and/or ng-eNB(s) 224 of the NG-RAN 220 may communicate directly with each other via backhaul connections 223, referred to as the "Xn-C" interface. One or more of gNBs 222 and/or ng-eNBs 224 may communicate with one or more UEs 204 over a wireless interface, referred to as the "Uu" interface.

The functionality of a gNB 222 may be divided between a gNB central unit (gNB-CU) 226, one or more gNB distributed units (gNB-DUs) 228, and one or more gNB radio units (gNB-RUs) 229. A gNB-CU 226 is a logical node that includes the base station functions of transferring user data, mobility control, radio access network sharing, positioning, session management, and the like, except for those functions allocated exclusively to the gNB-DU(s) 228. More specifically, the gNB-CU 226 generally host the radio resource control (RRC), service data adaptation protocol (SDAP), and packet data convergence protocol (PDCP) protocols of the gNB 222. A gNB-DU 228 is a logical node that generally hosts the radio link control (RLC) and medium access control (MAC) layer of the gNB 222. Its operation is controlled by the gNB-CU 226. One gNB-DU 228 can support one or more cells, and one cell is supported by only one gNB-DU 228. The interface 232 between the gNB-CU 226 and the one or more gNB-DUs 228 is referred to as the "F1" interface. The physical (PHY) layer functionality of a gNB 222 is generally hosted by one or more standalone gNB-RUs 229 that perform functions such as power amplification and signal transmission/reception. The interface between a gNB-DU 228 and a gNB-RU 229 is referred to as the "Fx" interface. Thus, a UE 204 communicates with the gNB-CU 226 via the RRC, SDAP, and PDCP layers, with a gNB-DU 228 via the RLC and MAC layers, and with a gNB-RU 229 via the PHY layer.

Deployment of communication systems, such as 5G NR systems, may be arranged in multiple manners with various components or constituent parts. In a 5G NR system, or network, a network node, a network entity, a mobility element of a network, a RAN node, a core network node, a network element, or a network equipment, such as a base station, or one or more units (or one or more components) performing base station functionality, may be implemented in an aggregated or disaggregated architecture. For example, a base station (such as a Node B (NB), evolved NB (eNB), NR base station, 5G NB, access point (AP), a transmit receive point (TRP), or a cell, etc.) may be implemented as an aggregated base station (also known as a standalone base station or a monolithic base station) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUS)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN ALLIANCE®)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

Figure 2C:
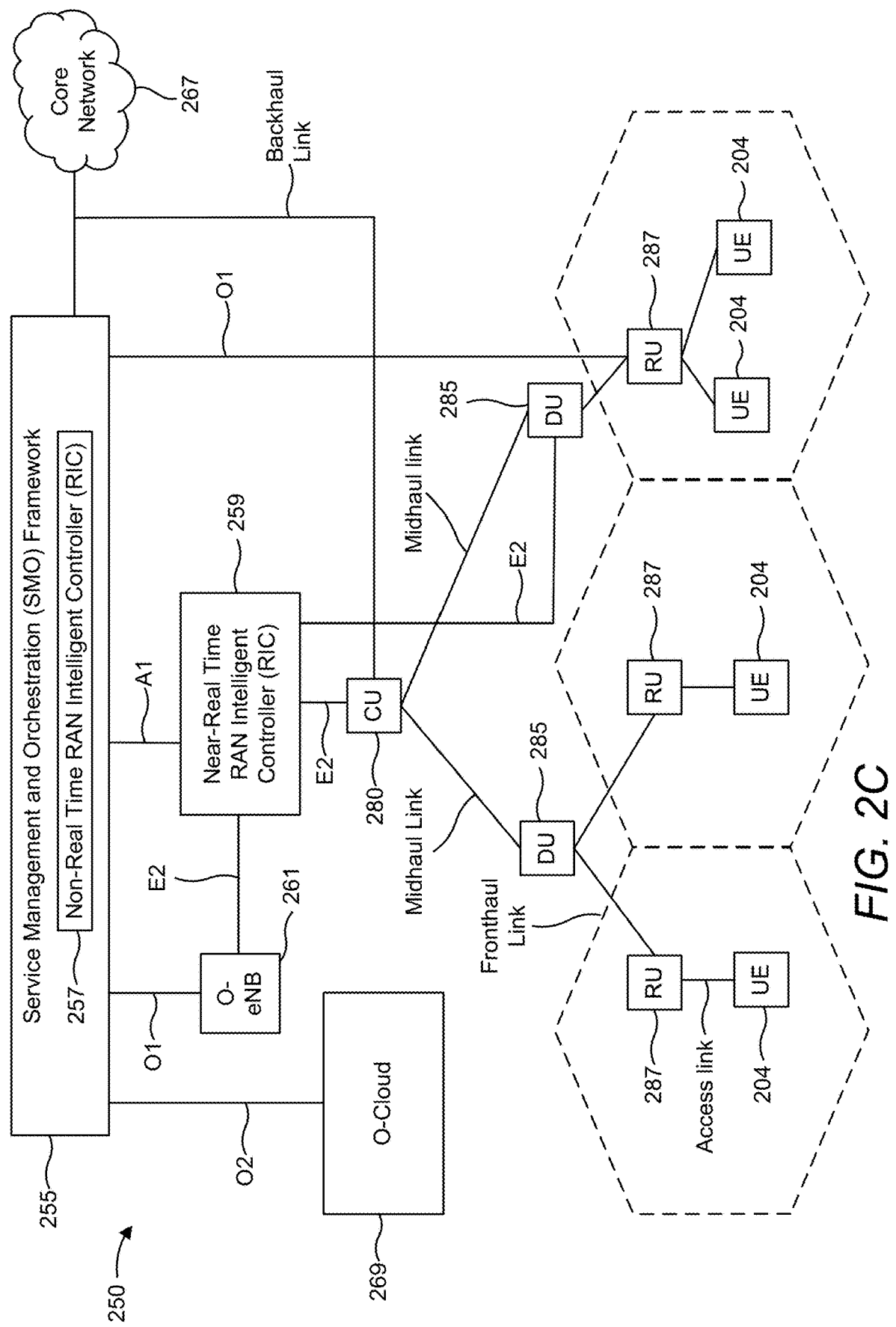

FIG. 2C illustrates an example disaggregated base station architecture 250, according to aspects of the disclosure. The disaggregated base station architecture 250 may include one or more central units (CUs) 280 (e.g., gNB-CU 226) that can communicate directly with a core network 267 (e.g., 5GC 210, 5GC 260) via a backhaul link, or indirectly with the core network 267 through one or more disaggregated base station units (such as a Near-Real Time (Near-RT) RAN Intelligent Controller (RIC) 259 via an E2 link, or a Non-Real Time (Non-RT) RIC 257 associated with a Service Management and Orchestration (SMO) Framework 255, or both). A CU 280 may communicate with one or more DUs 285 (e.g., gNB-DUs 228) via respective midhaul links, such as an F1 interface. The DUs 285 may communicate with one or more radio units (RUS) 287 (e.g., gNB-RUs 229) via respective fronthaul links. The RUs 287 may communicate with respective UEs 204 via one or more radio frequency (RF) access links. In some implementations, the UE 204 may be simultaneously served by multiple RUs 287.

Each of the units, i.e., the CUS 280, the DUs 285, the RUs 287, as well as the Near-RT RICs 259, the Non-RT RICs 257 and the SMO Framework 255, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a RF transceiver), configured to receive or transmit signals, or both, over a wireless transmission medium to one or more of the other units.

In some aspects, the CU 280 may host one or more higher layer control functions. Such control functions can include RRC, PDCP, service data adaptation protocol (SDAP), or the like. Each control function can be implemented with an interface configured to communicate signals with other control functions hosted by the CU 280. The CU 280 may be configured to handle user plane functionality (i.e., Central Unit-User Plane (CU-UP)), control plane functionality (i.e., Central Unit-Control Plane (CU-CP)), or a combination thereof. In some implementations, the CU 280 can be logically split into one or more CU-UP units and one or more CU-CP units. The CU-UP unit can communicate bidirectionally with the CU-CP unit via an interface, such as the E1 interface when implemented in an O-RAN configuration. The CU 280 can be implemented to communicate with the DU 285, as necessary, for network control and signaling.

The DU 285 may correspond to a logical unit that includes one or more base station functions to control the operation of one or more RUs 287. In some aspects, the DU 285 may host one or more of a RLC layer, a MAC layer, and one or more high PHY layers (such as modules for forward error correction (FEC) encoding and decoding, scrambling, modulation and demodulation, or the like) depending, at least in part, on a functional split, such as those defined by the 3rd Generation Partnership Project (3GPP®). In some aspects, the DU 285 may further host one or more low PHY layers. Each layer (or module) can be implemented with an interface configured to communicate signals with other layers (and modules) hosted by the DU 285, or with the control functions hosted by the CU 280.

Lower-layer functionality can be implemented by one or more RUs 287. In some deployments, an RU 287, controlled by a DU 285, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 287 can be implemented to handle over the air (OTA) communication with one or more UEs 204. In some implementations, real-time and non-real-time aspects of control and user plane communication with the RU(s) 287 can be controlled by the corresponding DU 285. In some scenarios, this configuration can enable the DU(s) 285 and the CU 280 to be implemented in a cloud-based RAN architecture, such as a vRAN architecture.

The SMO Framework 255 may be configured to support RAN deployment and provisioning of non-virtualized and virtualized network elements. For non-virtualized network elements, the SMO Framework 255 may be configured to support the deployment of dedicated physical resources for RAN coverage requirements which may be managed via an operations and maintenance interface (such as an O1 interface). For virtualized network elements, the SMO Framework 255 may be configured to interact with a cloud computing platform (such as an open cloud (O-Cloud) 269) to perform network element life cycle management (such as to instantiate virtualized network elements) via a cloud computing platform interface (such as an O2 interface). Such virtualized network elements can include, but are not limited to, CUs 280, DUs 285, RUS 287 and Near-RT RICs 259. In some implementations, the SMO Framework 255 can communicate with a hardware aspect of a 4G RAN, such as an open eNB (O-eNB) 261, via an O1 interface. Additionally, in some implementations, the SMO Framework 255 can communicate directly with one or more RUs 287 via an O1 interface. The SMO Framework 255 also may include a Non-RT RIC 257 configured to support functionality of the SMO Framework 255.

The Non-RT RIC 257 may be configured to include a logical function that enables non-real-time control and optimization of RAN elements and resources, artificial intelligence/machine learning (AI/ML) workflows including model training and updates, or policy-based guidance of applications/features in the Near-RT RIC 259. The Non-RT RIC 257 may be coupled to or communicate with (such as via an A1 interface) the Near-RT RIC 259. The Near-RT RIC 259 may be configured to include a logical function that enables near-real-time control and optimization of RAN elements and resources via data collection and actions over an interface (such as via an E2 interface) connecting one or more CUs 280, one or more DUs 285, or both, as well as an O-eNB, with the Near-RT RIC 259.

In some implementations, to generate AI/ML models to be deployed in the Near-RT RIC 259, the Non-RT RIC 257 may receive parameters or external enrichment information from external servers. Such information may be utilized by the Near-RT RIC 259 and may be received at the SMO Framework 255 or the Non-RT RIC 257 from non-network data sources or from network functions. In some examples, the Non-RT RIC 257 or the Near-RT RIC 259 may be configured to tune RAN behavior or performance. For example, the Non-RT RIC 257 may monitor long-term trends and patterns for performance and employ AI/ML models to perform corrective actions through the SMO Framework 255 (such as reconfiguration via O1) or via creation of RAN management policies (such as A1 policies).

Figure 3A:
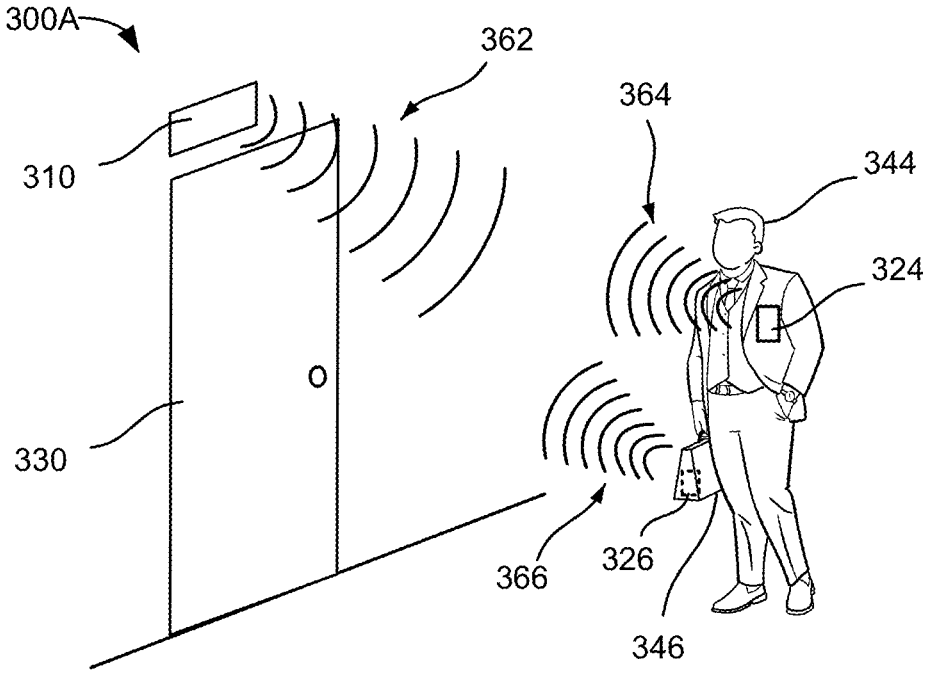
FIG. 3A illustrates an example Radio Frequency Identification (RFID) system, according to aspects of the disclosure.

Radio Frequency Identification (RFID) is a rapidly growing technology impacting many industries due to its economic potential for inventory/asset management inside and outside warehouse, IoT, sustainable sensor networks in factories and/or agriculture, and smart home. FIG. 3A illustrates an example RFID system 300A, according to aspects of the disclosure. In some aspects, the RFID system 300A includes an RFID station 310 configured as an RFID reader and RFID tags (or RFID transponders) 324 and 326. In this example, the RFID station 310 is for controlling the access to a door 330.

As shown in FIG. 3A, a person 344 (e.g., an employee) carrying an asset 346 (e.g., a suitcase) may want to access the door 330. The person 344 may carry the RFID tag 324 (e.g., embedded in an RFID enabled access card), and the asset 346 may have the RFID tag 326 (e.g., an RFID asset tag) attached thereon. To identify the person 344 or the asset 346 in order to grant or deny the access to the door 330, the RFID station 310 may transmit an interrogating signal 362. In response to the interrogating signal 362, the RFID tag 324 may transmit a response signal 364, and the RFID tag 326 may transmit a response signal 366. The response signal 364 may be modulated with data stored in the RFID tag 324 in response to a command encoded in the interrogating signal 362. Also, the response signal 366 may be modulated with data stored in the RFID tag 326 in response to the command encoded in the interrogating signal 362. The RFID station 310 may receive and decode the response signals 364 and 366 in order to obtain the response provided by the RFID tags 324 and 326.

FIG. 3A shows a possible application of an RFID system. In some aspects, applications of the RFID technology may include automated checkout, monitoring medication intakes for elderlies, vehicle ignition keys, employee attendance system, positioning objects, or tracking objects. In some aspects, the RFID tags may be attached to, embedded in, or integrally formed with a target or an object, including a wireless communications device, a shipping container, a merchandise, an identification card, a payment card, an automobile, or a pet.

In some aspects, the RFID station 310 may be configured to communicate with the RFID tags 324 and 326 over an air interface based on one or more RFID standards or wireless communications standards, such as those set by the International Organization for Standardization (ISO), the International Electrotechnical Commission (IEC), American Society for Testing and Materials (ASTM) International, the DASH7 Alliance, Electronic Product Code Global (EPC-global), and/or 3GPP standards for Passive IoT. In some examples, based on the frequency band of the air interface, the RFID technology may be referred to as Low Frequency (LF) RFID (e.g., from 30 kHz to 300 kHz), High Frequency (HF) RFID (e.g., from 3 MHz to 30 MHz), or Ultra High Frequency (UHF) RFID (e.g., from 300 MHz to 3 GHZ).

In some aspects, in operation, an RFID station or an RFID reader may transmit an interrogating signal to interrogate one or more RFID tags. The interrogating signal may be encoded with one or more commands that instruct the RFID tags to perform one or more actions.

In some aspects, an RFID tag that senses the interrogating signal may respond by transmitting back a response signal. In many applications, the RFID tag may adjust an impedance of its antenna and transmit the response signal by reflecting a portion of the interrogating signal in a process known as backscattering. In some implementations, an RFID tag may actively generate and transmit the response signal.

In some aspects, the response signal from the RFID tag may include a message that is encoded with data stored in the RFID tag, such as a serial number, a price, a date, a time, a destination, an encrypted message, an electronic signature, other attribute(s), any combination of attributes, and so on. The response signal is then received by the RFID station, where the message is demodulated and decoded by the RFID station.

In some aspects, the RFID tags may be categorized into three types of devices based on their capabilities, including passive RFID tags, semi-passive RFID tags, and active RFID tags.

In some aspects, a passive RFID tag may have no power source and may transmit the response signal by backscattering. In some aspects, a passive RFID tag may harvest electrical energy from ambient signals to power up. In some aspects, a passive RFID tag may have a limited computational capability and may not have the ability for advanced signal processing or operations (e.g., analog-to-digital conversion or digital-to-analog conversion). In some aspects, a semi-passive RFID tag may have its own power source and may still transmit the response signal by backscattering. In some aspects, a semi-passive RFID device may have an on-board limited power source that can be used to energize a microchip thereon.

In some aspects, an active RFID tag may have an on-board power source, and may generate and transmit the response signal by active transmission powered by the on-board power source. In some aspects, an active RFID tag may transmit the response signal to an RFID station regardless of whether the RFID tag is within a coverage range of the RFID station. In some aspects, an active RFID tag may still be capable of performing an energy harvesting operation.

Moreover, in some aspects, further studies in 3GPP on Passive IoT may include: use cases of interest not captured elsewhere in 3GPP, e.g., identification, tracking, and monitoring; scenarios of interest including public or private network, indoor or outdoor environment, and macro, micro, or pico cells; existing solutions that address the use cases of interest (e.g., RFID); determination of feasibility of use cases and scenarios; design targets including link budget, data rate, power consumption, cost, supported energy sources or energy harvesting techniques; and coexistence with UEs and infrastructure in frequency bands for current 3GPP technologies. As 5G is expanding to more fields in addition to eMBB, e.g., ultra-reliable low latency communications (URLLC) and/or MTC. 5G and beyond may be expanded to support passive IoT.

Figure 3B:
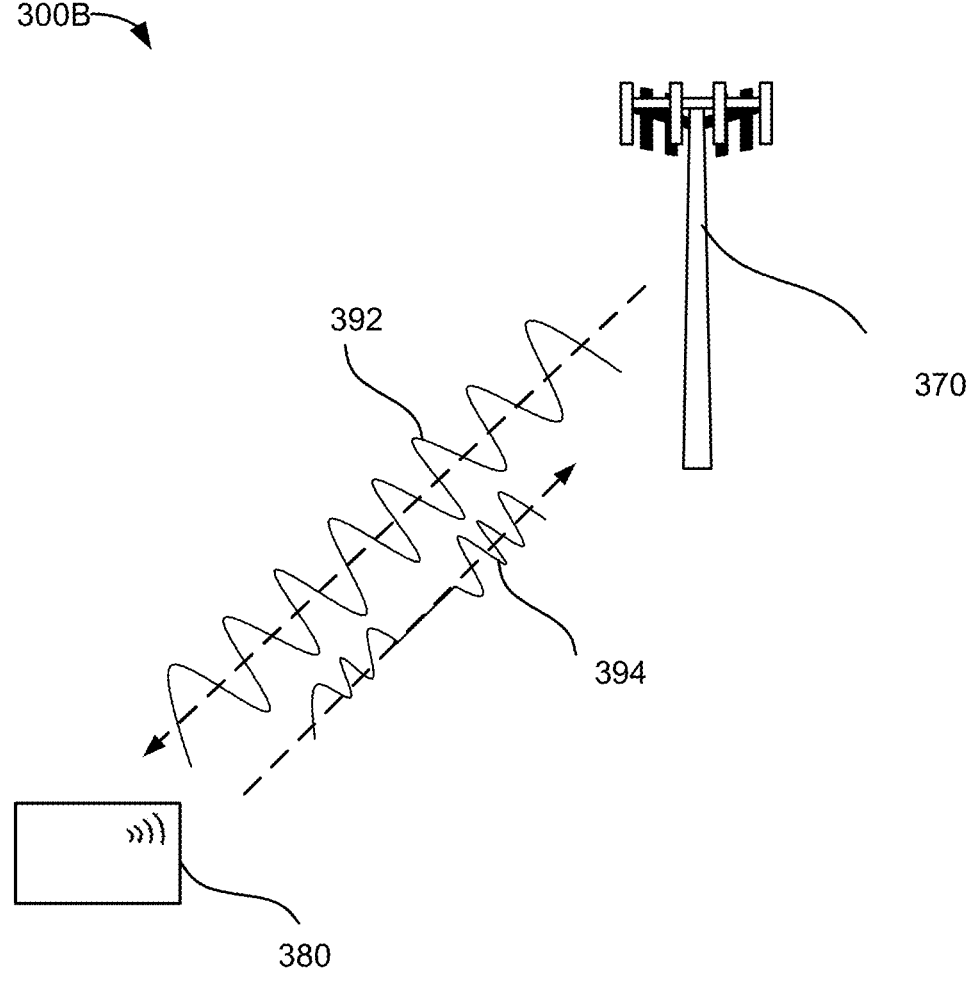
FIG. 3B illustrates an example configuration for a passive Internet of Things (IoT) use case, according to aspects of the disclosure.

In some aspects, an RFID system may be implemented integrally or in parallel (e.g., based on the same devices such as TRPs or UEs or based on the same radio resources) with the communications system 100 described above. FIG. 3B illustrates an example configuration 300B for a passive Internet of Things (IoT) use case, according to aspects of the disclosure. The configuration 300B may include a base station 370 configured as an RFID station and an RFID tag 380. The base station 370 may transmit an interrogating signal 392, and the RFID tag 380 may transmit a response signal 394 in response to the interrogating signal. In some aspects, RFID tag 380 may transmit the response signal 394 based on backscattering transmission or active transmission.

In some aspects, an RFID system may be implemented integrally or in parallel with a wireless communications system (e.g., the LTE or 5G NR as described above), and the RFID interrogating signals may be transmitted over a radio resource of the wireless communications system.

In some aspects, 3GPP developed specifications to support MTC/NB-IoT and reduced capability (RedCap) for MTC use cases. In some aspects, a later-developed communication standard, such as 3GPP release 18 and above or 6G, may be developed to more efficiently manage passive IoT devices. The communication standards may be developed to more efficiently support RFID-enabled devices, including that a gNB can read/write information stored on passive IoT devices; a gNB can provide energy to the passive IoT devices; an information-bearing signal may be reflected to gNB; and/or a gNB may read the reflected signal by passive IoT to decode the information transmitted by the IoT devices.

Figure 4A:
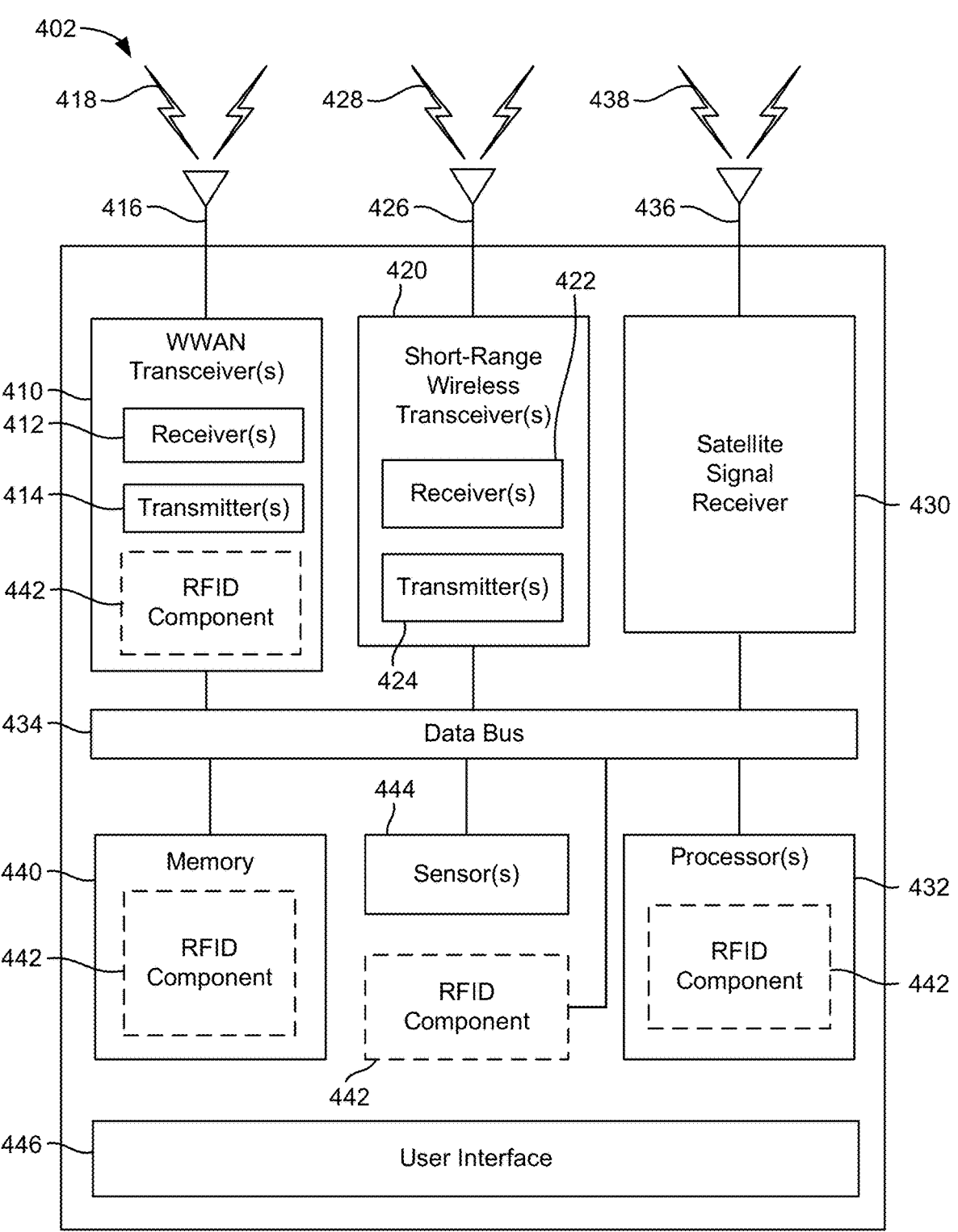
FIGS. 4A, 4B, and 4C are simplified block diagrams of several sample aspects of components that may be employed in a user equipment (UE), a base station, and a network entity, respectively, and configured to support communications as taught herein.
Figure 4B:
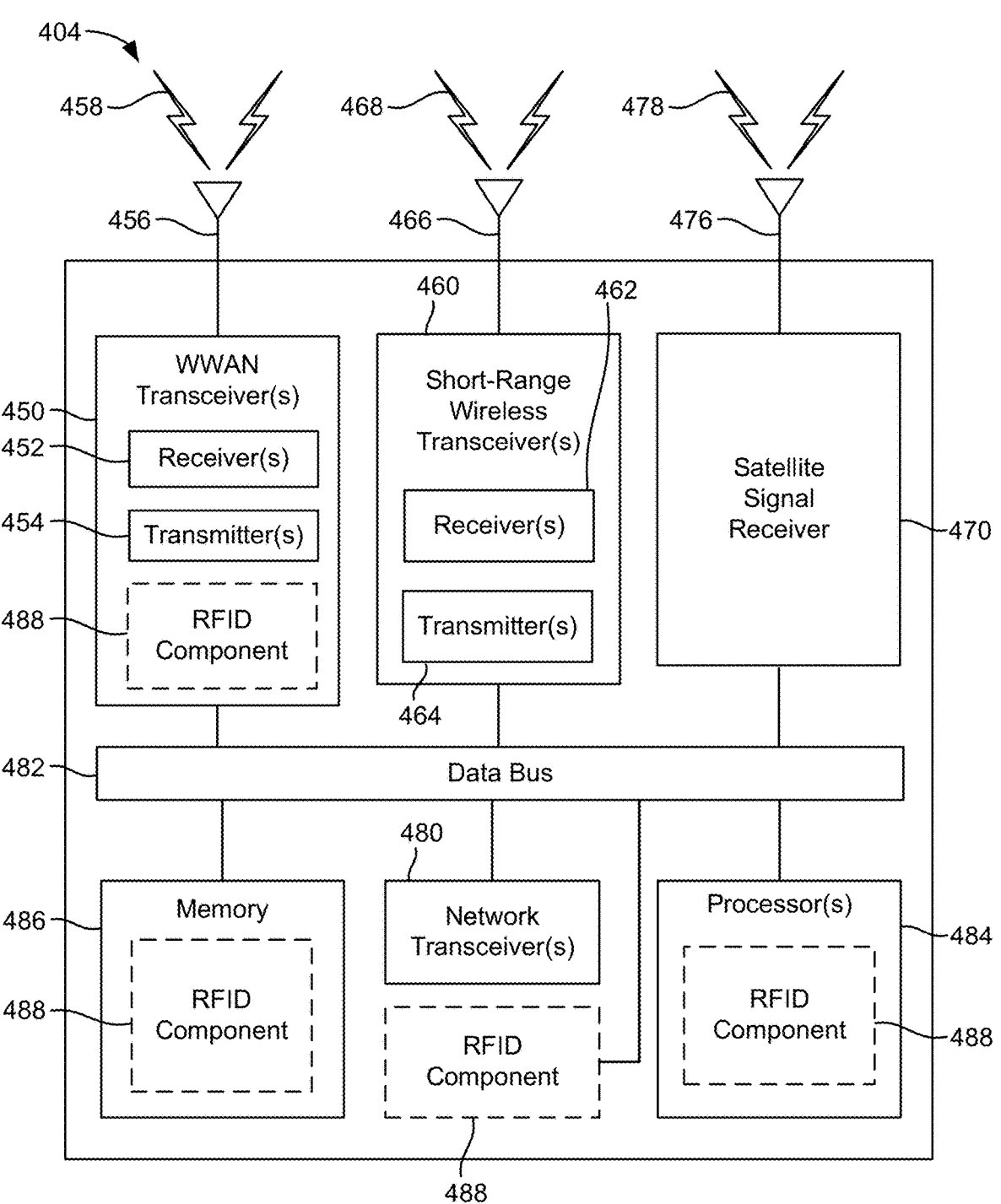
Figure 4C:
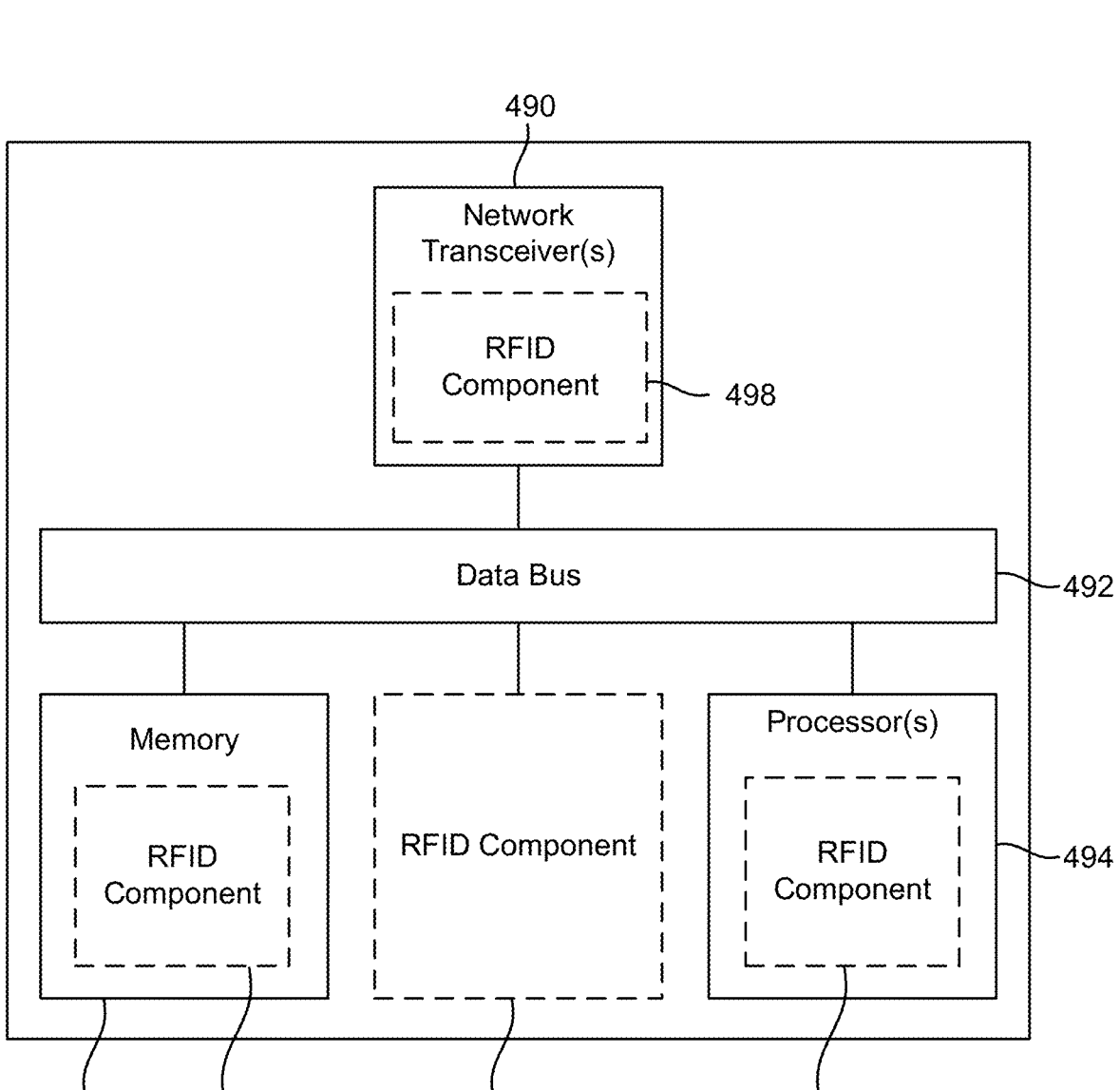

FIGS. 4A, 4B, and 4C illustrate several example components (represented by corresponding blocks) that may be incorporated into a UE 402 (which may correspond to any of the UEs described herein), a base station 404 (which may correspond to any of the base stations described herein), and a network entity 406 (which may correspond to or embody any of the network functions described herein, including the location server 230 and the LMF 270, or alternatively may be independent from the NG-RAN 220 and/or 5GC 210/260 infrastructure depicted in FIGS. 2A and 2B, such as a private network) to support the operations described herein. It will be appreciated that these components may be implemented in different types of apparatuses in different implementations (e.g., in an ASIC, in a system-on-chip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The UE 402 and the base station 404 each include one or more wireless wide area network (WWAN) transceivers 410 and 450, respectively, providing means for communicating (e.g., means for transmitting, means for receiving, means for measuring, means for tuning, means for refraining from transmitting, etc.) via one or more wireless communication networks (not shown), such as an NR network, an LTE network, a GSM network, and/or the like. The WWAN transceivers 410 and 450 may each be connected to one or more antennas 416 and 456, respectively, for communicating with other network nodes, such as other UEs, access points, base stations (e.g., eNBs, gNBs), etc., via at least one designated RAT (e.g., NR, LTE, GSM, etc.) over a wireless communication medium of interest (e.g., some set of time/frequency resources in a particular frequency spectrum). The WWAN transceivers 410 and 450 may be variously configured for transmitting and encoding signals 418 and 458 (e.g., messages, indications, information, and so on), respectively, and, conversely, for receiving and decoding signals 418 and 458 (e.g., messages, indications, information, pilots, and so on), respectively, in accordance with the designated RAT. Specifically, the WWAN transceivers 410 and 450 include one or more transmitters 414 and 454, respectively, for transmitting and encoding signals 418 and 458, respectively, and one or more receivers 412 and 452, respectively, for receiving and decoding signals 418 and 458, respectively.

The UE 402 and the base station 404 each also include, at least in some cases, one or more short-range wireless transceivers 420 and 460, respectively. The short-range wireless transceivers 420 and 460 may be connected to one or more antennas 426 and 466, respectively, and provide means for communicating (e.g., means for transmitting, means for receiving, means for measuring, means for tuning, means for refraining from transmitting, etc.) with other network nodes, such as other UEs, access points, base stations, etc., via at least one designated RAT (e.g., Wi-Fi, LTE Direct, BLUETOOTH®, ZIGBEE®, Z-WAVE®, PC5, dedicated short-range communications (DSRC), wireless access for vehicular environments (WAVE), near-field communication (NFC), ultra-wideband (UWB), etc.) over a wireless communication medium of interest. The short-range wireless transceivers 420 and 460 may be variously configured for transmitting and encoding signals 428 and 468 (e.g., messages, indications, information, and so on), respectively, and, conversely, for receiving and decoding signals 428 and 468 (e.g., messages, indications, information, pilots, and so on), respectively, in accordance with the designated RAT. Specifically, the short-range wireless transceivers 420 and 460 include one or more transmitters 424 and 464, respectively, for transmitting and encoding signals 428 and 468, respectively, and one or more receivers 422 and 462, respectively, for receiving and decoding signals 428 and 468, respectively. As specific examples, the short-range wireless transceivers 420 and 460 may be Wi-Fi transceivers, BLUETOOTH® transceivers, ZIGBEE® and/or Z-WAVE® transceivers, NFC transceivers, UWB transceivers, or vehicle-to-vehicle (V2V) and/or vehicle-to-everything (V2X) transceivers.

The UE 402 and the base station 404 also include, at least in some cases, satellite signal receivers 430 and 470. The satellite signal receivers 430 and 470 may be connected to one or more antennas 436 and 476, respectively, and may provide means for receiving and/or measuring satellite positioning/communication signals 438 and 478, respectively. Where the satellite signal receivers 430 and 470 are satellite positioning system receivers, the satellite positioning/communication signals 438 and 478 may be global positioning system (GPS) signals, global navigation satellite system (GLONASS®) signals, Galileo signals, Beidou signals, Indian Regional Navigation Satellite System (NAVIC), Quasi-Zenith Satellite System (QZSS), etc. Where the satellite signal receivers 430 and 470 are non-terrestrial network (NTN) receivers, the satellite positioning/communication signals 438 and 478 may be communication signals (e.g., carrying control and/or user data) originating from a 5G network. The satellite signal receivers 430 and 470 may comprise any suitable hardware and/or software for receiving and processing satellite positioning/communication signals 438 and 478, respectively. The satellite signal receivers 430 and 470 may request information and operations as appropriate from the other systems, and, at least in some cases, perform calculations to determine locations of the UE 402 and the base station 404, respectively, using measurements obtained by any suitable satellite positioning system algorithm.

The base station 404 and the network entity 406 each include one or more network transceivers 480 and 490, respectively, providing means for communicating (e.g., means for transmitting, means for receiving, etc.) with other network entities (e.g., other base stations 404, other network entities 406). For example, the base station 404 may employ the one or more network transceivers 480 to communicate with other base stations 404 or network entities 406 over one or more wired or wireless backhaul links. As another example, the network entity 406 may employ the one or more network transceivers 490 to communicate with one or more base station 404 over one or more wired or wireless backhaul links, or with other network entities 406 over one or more wired or wireless core network interfaces.

A transceiver may be configured to communicate over a wired or wireless link. A transceiver (whether a wired transceiver or a wireless transceiver) includes transmitter circuitry (e.g., transmitters 414, 424, 454, 464) and receiver circuitry (e.g., receivers 412, 422, 452, 462). A transceiver may be an integrated device (e.g., embodying transmitter circuitry and receiver circuitry in a single device) in some implementations, may comprise separate transmitter circuitry and separate receiver circuitry in some implementations, or may be embodied in other ways in other implementations. The transmitter circuitry and receiver circuitry of a wired transceiver (e.g., network transceivers 480 and 490 in some implementations) may be coupled to one or more wired network interface ports. Wireless transmitter circuitry (e.g., transmitters 414, 424, 454, 464) may include or be coupled to a plurality of antennas (e.g., antennas 416, 426, 456, 466), such as an antenna array, that permits the respective apparatus (e.g., UE 402, base station 404) to perform transmit "beamforming," as described herein. Similarly, wireless receiver circuitry (e.g., receivers 412, 422, 452, 462) may include or be coupled to a plurality of antennas (e.g., antennas 416, 426, 456, 466), such as an antenna array, that permits the respective apparatus (e.g., UE 402, base station 404) to perform receive beamforming, as described herein. In an aspect, the transmitter circuitry and receiver circuitry may share the same plurality of antennas (e.g., antennas 416, 426, 456, 466), such that the respective apparatus can only receive or transmit at a given time, not both at the same time. A wireless transceiver (e.g., WWAN transceivers 410 and 450, short-range wireless transceivers 420 and 460) may also include a network listen module (NLM) or the like for performing various measurements.

As used herein, the various wireless transceivers (e.g., transceivers 410, 420, 450, and 460, and network transceivers 480 and 490 in some implementations) and wired transceivers (e.g., network transceivers 480 and 490 in some implementations) may generally be characterized as "a transceiver," "at least one transceiver," or "one or more transceivers." As such, whether a particular transceiver is a wired or wireless transceiver may be inferred from the type of communication performed. For example, backhaul communication between network devices or servers will generally relate to signaling via a wired transceiver, whereas wireless communication between a UE (e.g., UE 402) and a base station (e.g., base station 404) will generally relate to signaling via a wireless transceiver.

The UE 402, the base station 404, and the network entity 406 also include other components that may be used in conjunction with the operations as disclosed herein. The UE 402, the base station 404, and the network entity 406 include one or more processors 432, 484, and 494, respectively, for providing functionality relating to, for example, wireless communication, and for providing other processing functionality. The processors 432, 484, and 494 may therefore provide means for processing, such as means for determining, means for calculating, means for receiving, means for transmitting, means for indicating, etc. In an aspect, the processors 432, 484, and 494 may include, for example, one or more general purpose processors, multi-core processors, central processing units (CPUs), ASICs, digital signal processors (DSPs), field programmable gate arrays (FPGAs), other programmable logic devices or processing circuitry, or various combinations thereof.

The UE 402, the base station 404, and the network entity 406 include memory circuitry implementing memories 440, 486, and 496 (e.g., each including a memory device), respectively, for maintaining information (e.g., information indicative of reserved resources, thresholds, parameters, and so on). The memories 440, 486, and 496 may therefore provide means for storing, means for retrieving, means for maintaining, etc. In some cases, the UE 402, the base station 404, and the network entity 406 may include RFID component 442, 488, and 498, respectively. The RFID component 442, 488, and 498 may be hardware circuits that are part of or coupled to the processors 432, 484, and 494, respectively, that, when executed, cause the UE 402, the base station 404, and the network entity 406 to perform the functionality described herein. In other aspects, the RFID component 442, 488, and 498 may be external to the processors 432, 484, and 494 (e.g., part of a modem processing system, integrated with another processing system, etc.). Alternatively, the RFID component 442, 488, and 498 may be memory modules stored in the memories 440, 486, and 496, respectively, that, when executed by the processors 432, 484, and 494 (or a modem processing system, another processing system, etc.), cause the UE 402, the base station 404, and the network entity 406 to perform the functionality described herein. FIG. 4A illustrates possible locations of the RFID component 442, which may be, for example, part of the one or more WWAN transceivers 410, the memory 440, the one or more processors 432, or any combination thereof, or may be a standalone component. FIG. 4B illustrates possible locations of the RFID component 488, which may be, for example, part of the one or more WWAN transceivers 450, the memory 486, the one or more processors 484, or any combination thereof, or may be a standalone component. FIG. 4C illustrates possible locations of the RFID component 498, which may be, for example, part of the one or more network transceivers 490, the memory 496, the one or more processors 494, or any combination thereof, or may be a standalone component.

The UE 402 may include one or more sensors 444 coupled to the one or more processors 432 to provide means for sensing or detecting movement and/or orientation information that is independent of motion data derived from signals received by the one or more WWAN transceivers 410, the one or more short-range wireless transceivers 420, and/or the satellite signal receiver 430. By way of example, the sensor(s) 444 may include an accelerometer (e.g., a micro-electrical mechanical systems (MEMS) device), a gyroscope, a geomagnetic sensor (e.g., a compass), an altimeter (e.g., a barometric pressure altimeter), and/or any other type of movement detection sensor. Moreover, the sensor(s) 444 may include a plurality of different types of devices and combine their outputs in order to provide motion information. For example, the sensor(s) 444 may use a combination of a multi-axis accelerometer and orientation sensors to provide the ability to compute positions in two-dimensional (2D) and/or three-dimensional (3D) coordinate systems.

In addition, the UE 402 includes a user interface 446 providing means for providing indications (e.g., audible and/or visual indications) to a user and/or for receiving user input (e.g., upon user actuation of a sensing device such a keypad, a touch screen, a microphone, and so on). Although not shown, the base station 404 and the network entity 406 may also include user interfaces.

Referring to the one or more processors 484 in more detail, in the downlink, IP packets from the network entity 406 may be provided to the processor 484. The one or more processors 484 may implement functionality for an RRC layer, a packet data convergence protocol (PDCP) layer, a radio link control (RLC) layer, and a medium access control (MAC) layer. The one or more processors 484 may provide RRC layer functionality associated with broadcasting of system information (e.g., master information block (MIB), system information blocks (SIBs)), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer PDUs, error correction through automatic repeat request (ARQ), concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmitter 454 and the receiver 452 may implement Layer-1 (L1) functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The transmitter 454 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency division multiplexing (OFDM) subcarrier, multiplexed with a reference signal (e.g., pilot) in the time and/or frequency domain, and then combined together using an inverse fast Fourier transform (IFFT) to produce a physical channel carrying a time domain OFDM symbol stream. The OFDM symbol stream is spatially precoded to produce multiple spatial streams. Channel estimates from a channel estimator may be used to determine the coding and modulation scheme, as well as for spatial processing. The channel estimate may be derived from a reference signal and/or channel condition feedback transmitted by the UE 402. Each spatial stream may then be provided to one or more different antennas 456. The transmitter 454 may modulate an RF carrier with a respective spatial stream for transmission.

At the UE 402, the receiver 412 receives a signal through its respective antenna(s) 416. The receiver 412 recovers information modulated onto an RF carrier and provides the information to the one or more processors 432. The transmitter 414 and the receiver 412 implement Layer-1 functionality associated with various signal processing functions. The receiver 412 may perform spatial processing on the information to recover any spatial streams destined for the UE 402. If multiple spatial streams are destined for the UE 402, they may be combined by the receiver 412 into a single OFDM symbol stream. The receiver 412 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 404. These soft decisions may be based on channel estimates computed by a channel estimator. The soft decisions are then decoded and de-interleaved to recover the data and control signals that were originally transmitted by the base station 404 on the physical channel. The data and control signals are then provided to the one or more processors 432, which implements Layer-3 (L3) and Layer-2 (L2) functionality.

In the downlink, the one or more processors 432 provides demultiplexing between transport and logical channels, packet reassembly, deciphering, header decompression, and control signal processing to recover IP packets from the core network. The one or more processors 432 are also responsible for error detection.

Similar to the functionality described in connection with the downlink transmission by the base station 404, the one or more processors 432 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through hybrid automatic repeat request (HARQ), priority handling, and logical channel prioritization.

Channel estimates derived by the channel estimator from a reference signal or feedback transmitted by the base station 404 may be used by the transmitter 414 to select the appropriate coding and modulation schemes, and to facilitate spatial processing. The spatial streams generated by the transmitter 414 may be provided to different antenna(s) 416. The transmitter 414 may modulate an RF carrier with a respective spatial stream for transmission.

The uplink transmission is processed at the base station 404 in a manner similar to that described in connection with the receiver function at the UE 402. The receiver 452 receives a signal through its respective antenna(s) 456. The receiver 452 recovers information modulated onto an RF carrier and provides the information to the one or more processors 484.

In the uplink, the one or more processors 484 provides demultiplexing between transport and logical channels, packet reassembly, deciphering, header decompression, control signal processing to recover IP packets from the UE 402. IP packets from the one or more processors 484 may be provided to the core network. The one or more processors 484 are also responsible for error detection.

For convenience, the UE 402, the base station 404, and/or the network entity 406 are shown in FIGS. 4A, 4B, and 4C as including various components that may be configured according to the various examples described herein. It will be appreciated, however, that the illustrated components may have different functionality in different designs. In particular, various components in FIGS. 4A to 4C are optional in alternative configurations and the various aspects include configurations that may vary due to design choice, costs, use of the device, or other considerations. For example, in case of FIG. 4A, a particular implementation of UE 402 may omit the WWAN transceiver(s) 410 (e.g., a wearable device or tablet computer or personal computer (PC) or laptop may have Wi-Fi and/or BLUETOOTH® capability without cellular capability), or may omit the short-range wireless transceiver(s) 420 (e.g., cellular-only, etc.), or may omit the satellite signal receiver 430, or may omit the sensor(s) 444, and so on. In another example, in case of FIG. 4B, a particular implementation of the base station 404 may omit the WWAN transceiver(s) 450 (e.g., a Wi-Fi "hotspot" access point without cellular capability), or may omit the short-range wireless transceiver(s) 460 (e.g., cellular-only, etc.), or may omit the satellite signal receiver 470, and so on. For brevity, illustration of the various alternative configurations is not provided herein, but would be readily understandable to one skilled in the art.

The various components of the UE 402, the base station 404, and the network entity 406 may be communicatively coupled to each other over data buses 434, 482, and 492, respectively. In an aspect, the data buses 434, 482, and 492 may form, or be part of, a communication interface of the UE 402, the base station 404, and the network entity 406, respectively. For example, where different logical entities are embodied in the same device (e.g., gNB and location server functionality incorporated into the same base station 404), the data buses 434, 482, and 492 may provide communication between them.

The components of FIGS. 4A, 4B, and 4C may be implemented in various ways. In some implementations, the components of FIGS. 4A, 4B, and 4C may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 410 to 446 may be implemented by processor and memory component(s) of the UE 402 (e.g., by execution of appropriate code and/or by appropriate configuration of processor components). Similarly, some or all of the functionality represented by blocks 450 to 488 may be implemented by processor and memory component(s) of the base station 404 (e.g., by execution of appropriate code and/or by appropriate configuration of processor components). Also, some or all of the functionality represented by blocks 490 to 498 may be implemented by processor and memory component(s) of the network entity 406 (e.g., by execution of appropriate code and/or by appropriate configuration of processor components). For simplicity, various operations, acts, and/or functions are described herein as being performed "by a UE," "by a base station," "by a network entity," etc. However, as will be appreciated, such operations, acts, and/or functions may actually be performed by specific components or combinations of components of the UE 402, base station 404, network entity 406, etc., such as the processors 432, 484, 494, the transceivers 410, 420, 450, and 460, the memories 440, 486, and 496, the RFID component 442, 488, and 498, etc.

In some designs, the network entity 406 may be implemented as a core network component. In other designs, the network entity 406 may be distinct from a network operator or operation of the cellular network infrastructure (e.g., NG RAN 220 and/or 5GC 210/260). For example, the network entity 406 may be a component of a private network that may be configured to communicate with the UE 402 via the base station 404 or independently from the base station 404 (e.g., over a non-cellular communication link, such as Wi-Fi).

Figure 5:
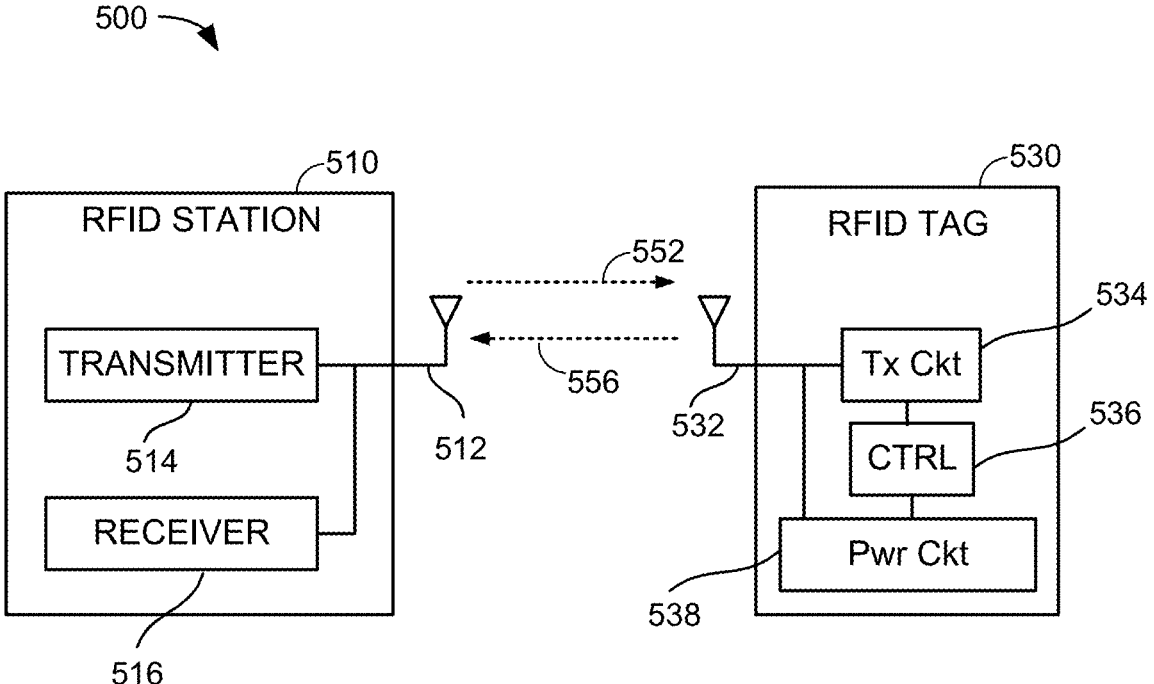
FIG. 5 illustrates a simplified block diagram of an RFID station and an RFID tag in an RFID system, according to aspects of the disclosure.

FIG. 5 illustrates a simplified block diagram of an RFID station 510 and an RFID tag 530 in an RFID system 500, according to aspects of the disclosure. In some aspects, the RFID station 510 may be an RFID reader and correspond to the RFID station 310 in FIG. 3. In some aspects, the RFID tag 530 may correspond to the RFID tag 324 or 326 in FIG. 3.

As shown in FIG. 5, the RFID station 510 includes an antenna 512, and a transmitter 514 and a receiver 516 electrically coupled with the antenna 512. Also, the RFID tag 530 includes an antenna 532, transmitting circuitry 534 (abbreviated as "Tx Ckt" in FIG. 5) configured to transmitting a response signal via the antenna 532, a controller 536

(abbreviated as "CTRL" in FIG. 5) configured to control the transmitting circuitry 534, and power circuitry 538 (abbreviated as "Pwr Ckt" in FIG. 5) configured to provide the electrical power to the controller 536 and the transmitting circuitry 534.

In some aspects, the RFID tag 530 may be capable of transmitting the response signal based on active transmission. In such scenario, the transmitting circuitry 534 may include a transmitter that is configured to actively transmit the response signal via the antenna 532. In some aspects, the RFID tag 530 may be capable of transmitting the response signal based on backscattering transmission. In such scenario, the transmitting circuitry 534 may include an antenna impedance adjusting circuit configured to adjust an impedance of the antenna 532.

In some aspects, a TRP in a wireless communications system may be configured to function as, or to incorporate, the RFID station 510. In such scenario, the RFID station 510 may correspond to the base station 404, the transmitter 514 may correspond to the transmitter 454 and/or the RFID component 488 in the WWAN transceivers 450, or the transmitter 464 in the short-range wireless transceivers 460; the receiver 516 may correspond to the receiver 452 and/or the RFID component 488 in the WWAN transceivers 450, or the receiver 462 in the short-range wireless transceivers 460; and the antenna 512 may correspond to the antenna 456 or the antenna 466. In some aspects, a UE in a wireless communications system may be configured to function as, or to incorporate, the RFID station 510. In such scenario, the RFID station 510 may correspond to the UE 402, the transmitter 514 may correspond to the transmitter 414 and/or the RFID component 442 in the WWAN transceivers 420, or the transmitter 424 in the short-range wireless transceivers 420; the receiver 516 may correspond to the receiver 412 and/or the RFID component 442 in the WWAN transceivers 420, or the receiver 422 in the short-range wireless transceivers 420; and the antenna 512 may correspond to the antenna 416 or the antenna 426.

In some aspects, a UE in a wireless communications system may be configured to function as, or to incorporate, the RFID tag 530. In such scenario, the RFID tag 530 may correspond to the UE 402, the transmitting circuitry 534, the controller 536, and the power circuitry 538 may correspond to the RFID component 442, and the antenna 532 may correspond to the antenna 416 or the antenna 426.

In some aspects, in operation, the transmitter 514 of the RFID station 510 may transmit an interrogating signal 552 via the antenna 512 to the RFID tag 530. In some aspects, the interrogating signal 552 may be embedded with a command from the RFID station 510. The command may provide the RFID tag 530 a time frame for responding to the interrogating signal 552, instruct the RFID tag 530 to provide its identification code or other information related to the identity or capability of the RFID tag 530, or both. The RFID tag 530, when being powered on and upon receiving the interrogating signal 552, may cause the controller 536 to prepare a response message based on the embedded command and to control the transmitting circuitry 534 to transmit a response signal based on the prepared response message, either by active transmission or backscattering transmission. In some aspects, the controller 536 may control the transmitting circuitry 534 to modulate the response signal 556 to carry the response message.

In some aspects, the RFID tag 530 may be a passive RFID tag. In such scenario, the power circuitry 538 may harvest the electrical power from the interrogating signal 552 to power the controller 536 and the transmitting circuitry 534.

In some aspects, the RFID tag 530 may be a semi-passive RFID tag or an active RFID tag. In such scenario, the power circuitry 538 may power the controller 536 and the transmitting circuitry 534 based on the harvested power from the interrogating signal 552 or an on-board battery (not shown) of the RFID tag 530. Also, in some examples, the power circuitry 538 may perform the energy harvesting functionality for detecting the presence or absence of the interrogating signal 552 or other purposes as further illustrated in this disclosure.

Moreover, the receiver 516 of the RFID station 510 may receive the response signal 556 from the RFID tag 530 via the antenna 512. The RFID station 510 may decode the response signal 556 to obtain the response message provided by the RFID tag 530. In some aspects, the RFID system 500 may be used to measure a range or estimate a position of the RFID tag 530. In such application, the RFID station 510 may also measure a time of arrival (ToA) of the response signal 556 as observed at the RFID station 510.

In some aspects, an RFID system may also be used in many ways for locating and identifying objects to which the corresponding RFID tags are attached, as well as reading and/or writing information to/from the RFID devices. In some examples, an RFID system may be used in various applications in product-related and service-related industries for tracking objects being processed, inventoried, or handled. In such cases, an RFID device is usually attached to an individual item or to a package.

Figure 6:
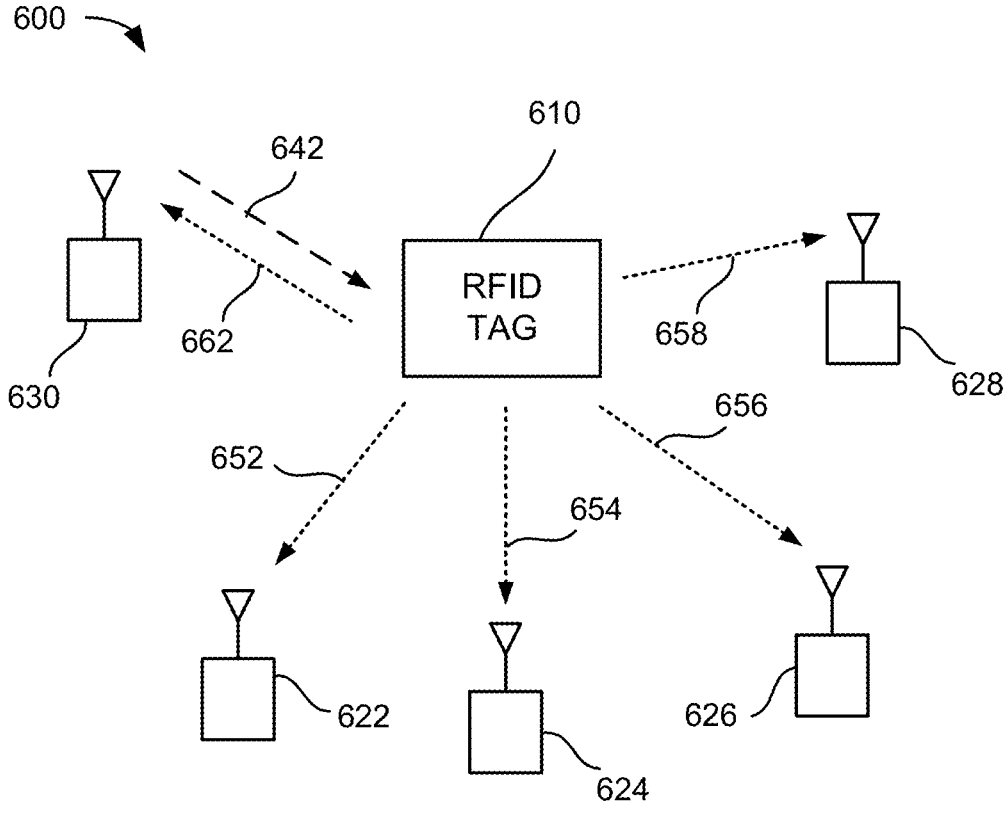
FIG. 6 illustrates an example RFID system for a backscatter-based positioning procedure, according to aspects of the disclosure.

FIG. 6 illustrates an example RFID system 600 for a backscatter-based positioning procedure, according to aspects of the disclosure. The RFID system 600 includes an RFID tag 610, and a position of which is to be determined based on the backscatter-based positioning procedure. The RFID system 600 includes one or more receiving RFID stations 622, 624, 626, and 628. The RFID system 600 further includes a transmitting RFID station 630. In some examples, the RFID station 630 may also be configured as a receiving RFID station. In some aspects, the RFID system 600 may include one or more transmitting RFID stations.

In some aspects, the RFID tag 610 may correspond to a standalone RFID tag, an RFID tag included or embedded in a device, or a device configured to function as an RFID tag. In some aspect, the RFID tag 610 may correspond to the RFID tags described in FIG. 3A, 3B, or 5. In some aspects, the RFID stations 622, 624, 626, 628, and 630 may correspond to the RFID stations described in FIG. 3A, 3B, or 5. In some aspects, each one of the RFID stations 622, 624, 626, 628, and 630 may be a UE (such as any UE described above) or a TRP (such as any TRP described above) of a wireless communications network.

In some aspects, to perform the backscatter-based positioning procedure, the RFID station 630 may transmit an interrogating signal 642 to the RFID tag 610. In some aspects, the interrogating signal 642 may be a positioning reference signal of the wireless communications network, such as a downlink positioning reference signal (DL-PRS), a sidelink positioning reference signal (SL-PRS), or a sounding reference signal (SRS). In response to the interrogating signal 642, the RFID tag 610 may transmit a backscattered signal by reflecting (also referred to as backscattering in this disclosure) the interrogating signal 642. The backscattered signal may be observed at the RFID stations 622, 624, 626, 628, and 630 and labeled in FIG. 6 as respective received backscattered signals 652, 654, 656, 658, and 662.

In some aspects, the RFID stations 622, 624, 626, 628, and 630 may record the time points (or also referred to as arrival times) the received backscattered signals 652, 654, 656, 658, and 662 arrive. Based on the measured reception time points and the time of transmission of the interrogating signal 642 at the RFID station 630, the combined propagation time of the interrogating signal 642 and the received backscattered signals 652, 654, 656, 658, and 662, denoted as 11, 12, 13, 14, and to, may satisfy the following expressions:

$$\tau_1 = \tau_{tx-TAG} + \tau_{TAG-rx1},$$
$$\tau_2 = \tau_{tx-TAG} + \tau_{TAG-rx2},$$
$$\tau_3 = \tau_{tx-TAG} + \tau_{TAG-rx3},$$
$$\tau_4 = \tau_{tx-TAG} + \tau_{TAG-rx4},$$
$$\tau_0 = \tau_{tx-TAG} + \tau_{TAG-rx0},$$

and $$\tau_{tx-TAG} = \tau_{TAG-rx0}.$$

$\tau_{tx-TAG}$ represents the propagation time from the transmitting RFID station 630 to the RFID tag 610. $\tau_{TAG-rx0}$ represents the propagation time from the RFID tag 610 to the transmitting RFID station 630. $\tau_{TAG-rx1}$ represents the propagation time from the RFID tag 610 to the receiving RFID station 622. $\tau_{TAG-rx2}$ represents the propagation time from the RFID tag 610 to the receiving RFID station 624. $\tau_{TAG-rx3}$ represents the propagation time from the RFID tag 610 to the receiving RFID station 626. $\tau_{TAG-rx4}$ represents the propagation time from the RFID tag 610 to the receiving RFID station 628.

In some aspects, based on $\tau_1$, $\tau_2$, $\tau_3$, $\tau_4$, and $\tau_0$, an estimated position of the RFID tag 610 may be determined based on a Time-of-Arrival (ToA) positioning method. In some examples, the time-of-arrival values may correspond to the propagation time values from the RFID tag 610 to the respective RFID stations 622, 624, 626, 628, and 630 may have the relationship of:

$$\tau_{TAG-rx0} = \frac{\tau_0}{2},$$
$$\tau_{TAG-rx1} = \tau_1 - \frac{\tau_0}{2},$$
$$\tau_{TAG-rx2} = \tau_2 - \frac{\tau_0}{2},$$
$$\tau_{TAG-rx3} = \tau_3 - \frac{\tau_0}{2},$$
$$\tau_{TAG-rx4} = \tau_4 - \frac{\tau_0}{2}.$$

The estimated ranges between the RFID tag 610 and the respective RFID stations 622, 624, 626, 628, and 630 may be calculated by multiplying the time-of-arrival values by the speed of the RF waves (e.g., the speed of light). Moreover, based on the estimated ranges and the position information of the RFID stations 622, 624, 626, 628, and 630, the estimated position of the RFID tag 610 may be derived.

In some aspects, based on $\tau_1$, $\tau_2$, $\tau_3$, $\tau_4$, and $\tau_0$, an estimated position of the RFID tag 610 may be determined based on a Time Difference of Arrival (TDOA) positioning method. In some examples, the propagation time differences between any two of the RFID stations 622, 624, 626, 628, and 630 may have the expressions of: $\nabla_{\tau i, j} = \tau_{TAG-rxi} - \tau_{TAG-}$ $r_{ij} = \tau_i - \tau_j$, where i an j represents the corresponding two of the RFID stations 622, 624, 626, 628, and 630. The estimated curves that pass through the RFID tag 610 may be determined based on the multiplication of the propagation time differences and the speed of the RF waves (e.g., the speed of light), and the estimated position of the RFID tag 610 may be derived based on cross-sections of the estimated curves.

In some aspects, based on $\tau_0$, an estimated range between the RFID tag 610 and the RFID station 630 may also be determined based on a Round Trip Time (RTT) positioning method.

FIG. 6 shows a non-limiting example for a backscatter-based positioning procedure having a transmitting RFID station that also functions as a receiving RFID station, together with four other receiving RFID stations. In some examples for performing a backscatter-based positioning procedure, the transmitting RFID station may be configured not to function as a receiving RFID station. Also, in some examples for performing a backscatter-based positioning procedure, a number of transmitting or receiving RFID stations may be different from the example shown in FIG. 6.

However, in some aspects, the backscatter-based positioning procedure (e.g., with response signals transmitted by backscattering transmission) and/or an RFID-based positioning procedure (e.g., with response signals transmitted by active transmission) performed based on ToA. TDOA, or RTT positioning methods may require higher tag-side hardware and/or processing complexity, and may cause higher reader-side signal interferences.

In another example, an RFID system may determine an estimated position (or ranges) of an RFID tag based on the signal propagation losses between the RFID tag and one or more RFID stations. In some aspects, the RFID tag and the RFID stations may measure the signal strengths (e.g., the measurement of a received signal strength indicator, RSSI) of the interrogating signals and/or the response signals. In some aspects, an RFID station may obtain the RSSI of an interrogating signal as observed at an RFID tag in order to determine a distance between the RFID station and the RFID tag.

Figure 7:
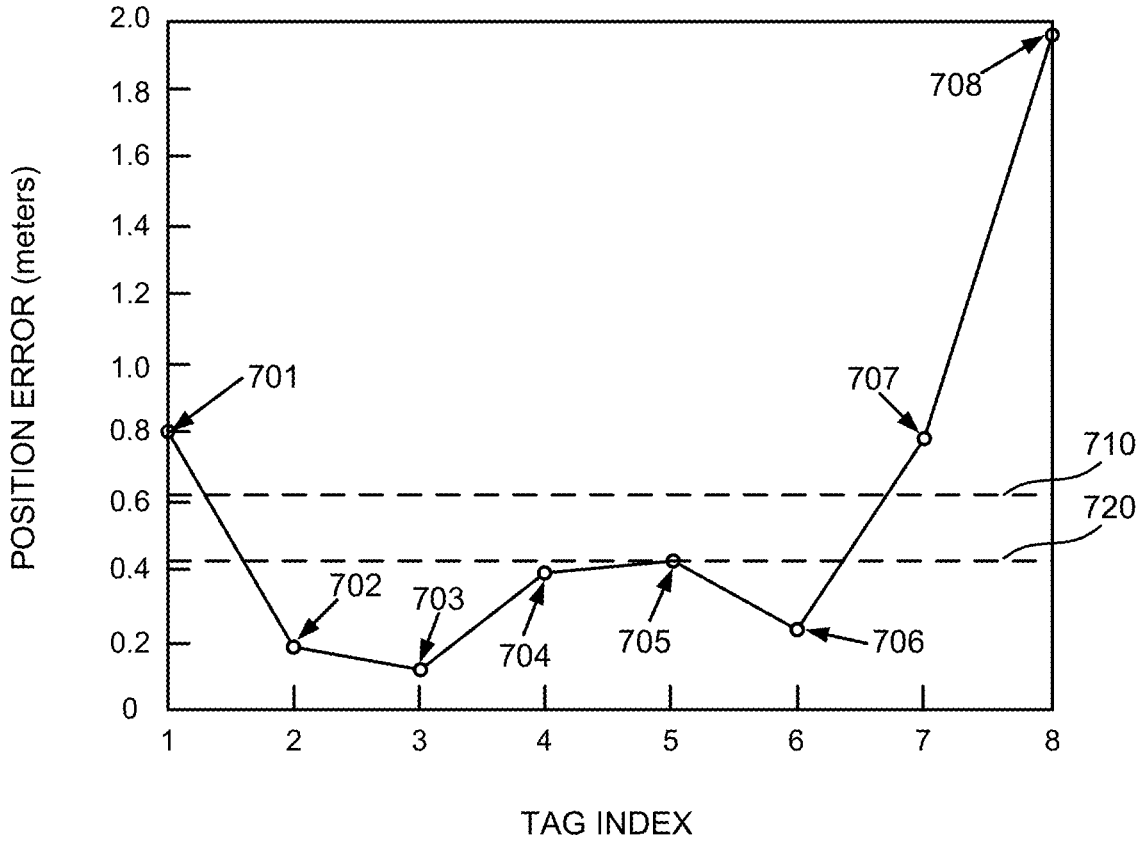
FIG. 7 illustrates observed positioning errors of a field test example for determining the estimated positions of RFID tags based on a signal strength-based positioning procedure, according to aspects of the disclosure.

FIG. 7 illustrates observed positioning errors of a field test example for determining the estimated positions of RFID tags based on a signal strength-based positioning procedure, according to aspects of the disclosure. As shown in FIG. 7, the horizontal axis represents 8 different RFID tags with tag indices 1-8. The vertical axis represents position errors in meters. As shown in FIG. 7. RFID tags with tag indices 1-8 according to the field test example have position errors recorded as data points 701-708, respectively. In this field test example, the signal strength-based positioning procedure may achieve about 0.6 meters average accuracy (as indicated by line 710) considering all the data points 701-708 and about 0.4 meters average accuracy (as indicated by line 720) excluding the outlier data point 708.

In some aspects, the signal strength-based positioning procedure may impose no or little additional hardware and/or processing complexity to the RFID tags or RFID stations in an RFID system. However, in some aspects, the signal strength-based positioning procedure may require the RFID tags to report the measured signal strengths (e.g., RSSIs), which may still may still impose some implementation complexity or latency in the positioning procedure.

Figure 8:
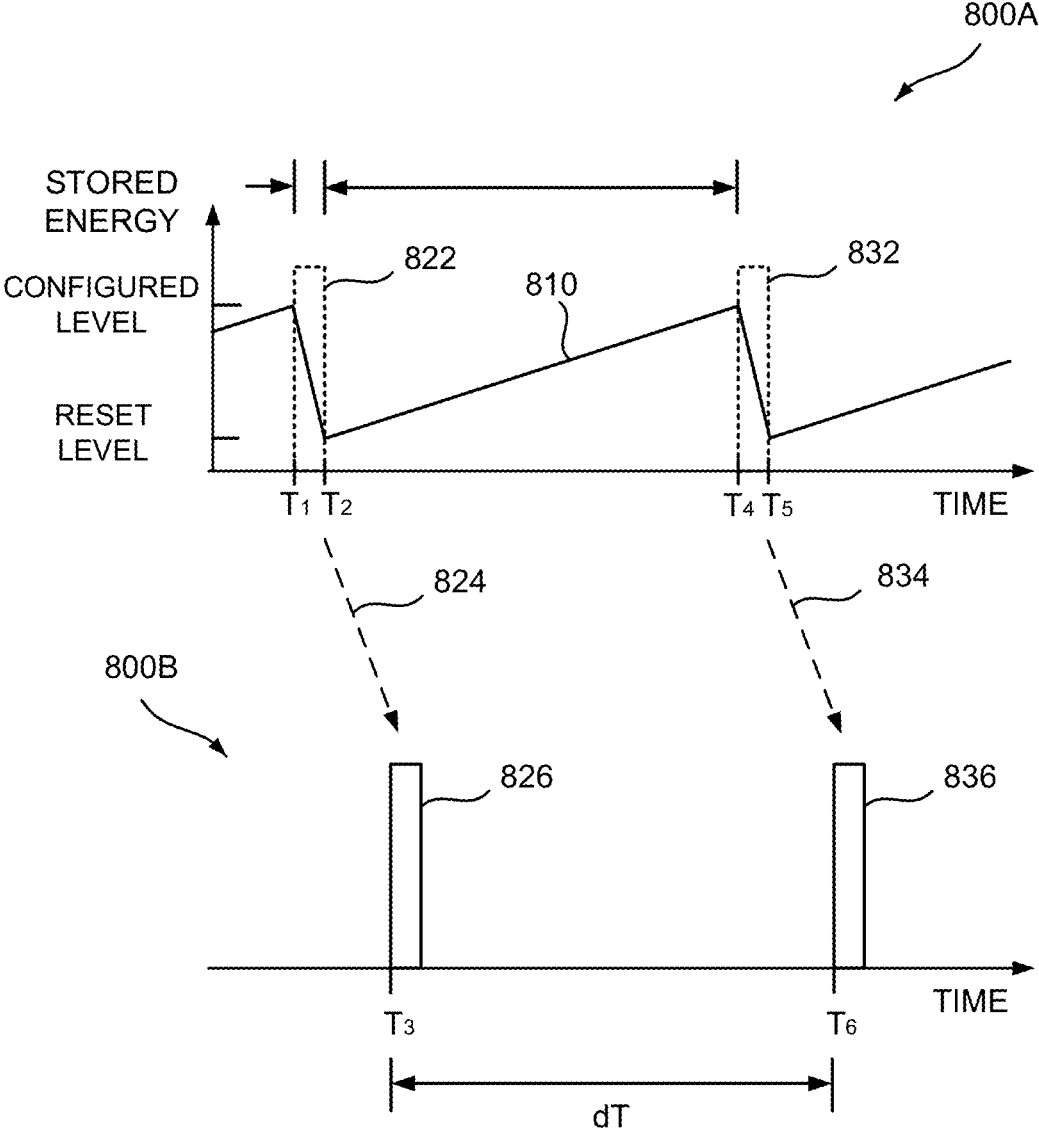
FIG. 8 illustrates an example of performing a positioning procedure based on an inter-packet arrival time, including a first timing diagram showing the operations of an RFID tag and a second timing diagram showing the operations of an RFID station, according to aspects of the disclosure.

FIG. 8 illustrates an example of performing a positioning procedure based on an inter-packet arrival time, including a first timing diagram 800A showing the operations of an RFID tag and a second timing diagram 800B showing the operations of an RFID station, according to aspects of the disclosure. In the first timing diagram 800A, the horizontal axis (labeled as "TIME") represents time, and the vertical axis (labeled as "STORED ENERGY") represents a level of energy stored in an energy storage device of the RFID tag. In some aspects, the level of energy may be measurable in units of volts, joules, and/or watt-hour. In the second timing diagram 800B, the horizontal axis (labeled as "TIME") represents time.

In some aspects, the RFID tag described in FIG. 8 may correspond to any of the RFID tags described in FIG. 3A, 3B, or 5. In some aspects, the RFID station described in FIG. 8 may correspond to any of the RFID stations described in FIG. 3A, 3B, or 5.

As shown in the first timing diagram 800A, the RFID tag may store energy in the energy storage device, and the level of energy stored in the energy storage device is indicated by line 810. The RFID tag may transmit at a first transmission time $T_1$ a first packet to the RFID station (represented by block 822 and arrow 824). The RFID tag may be energized by the energy stored in the energy storage device of the RFID tag. In some aspects, at time $T_2$, the energy level of the energy storage device of the RFID tag may be reset to a reset level as a result of the first packet being transmitted. As shown in the second timing diagram 800B, the RFID station may receive the first packet (represented by block 826) at a first arrival time $T_3$.

After time $T_2$, the RFID tag may harvest energy at least based on radio frequency waves from the RFID station after the first packet being transmitted. The RFID tag may store the harvested energy in the energy storage device. As indicated by line 810 after time $T_2$, the energy level of the energy storage device increases as time passes. At time $T_4$, the energy level of the energy storage device may reach a configured level.

In some aspects, the RFID tag may transmit at a second transmission time $T_4$ a second packet to the RFIDs station (represented by block 832 and arrow 834) based on the energy level of the energy storage device reaching the configured level. In some aspects, at time $\tau_5$, the energy level of the energy storage device of the RFID tag may again be reset to the reset level as a result of the second packet being transmitted. As shown in the second timing diagram 800B, the RFID station may receive the second packet (represented by block 836) at a second arrival time $T_6$ after the first arrival time $T_3$. In some aspects, the transmission of the first packet and the second packet may enable the RFID station to determine an inter-packet arrival time between the first packet and the second packet, such as based on a time difference (labeled as dT) between the first arrival time $T_3$ and the second arrival time $T_6$. In some aspects, the RFID station may estimate a distance between the RFID station and the RFID tag based on the inter-packet arrival time.

In some aspects, the RFID station may estimate the distance between the RFID station and the RFID tag based on a mapping relationship between different possible inter-packet arrival times and respective estimated distance values (e.g., corresponding to the distance directly, or to RSSI from which the distance may be derivable). In general, the longer the distance between the RFID station and the RFID tag, the longer the charging time the RFID tag needs in order to charge the energy storage device to the configured level.

Figure 9:
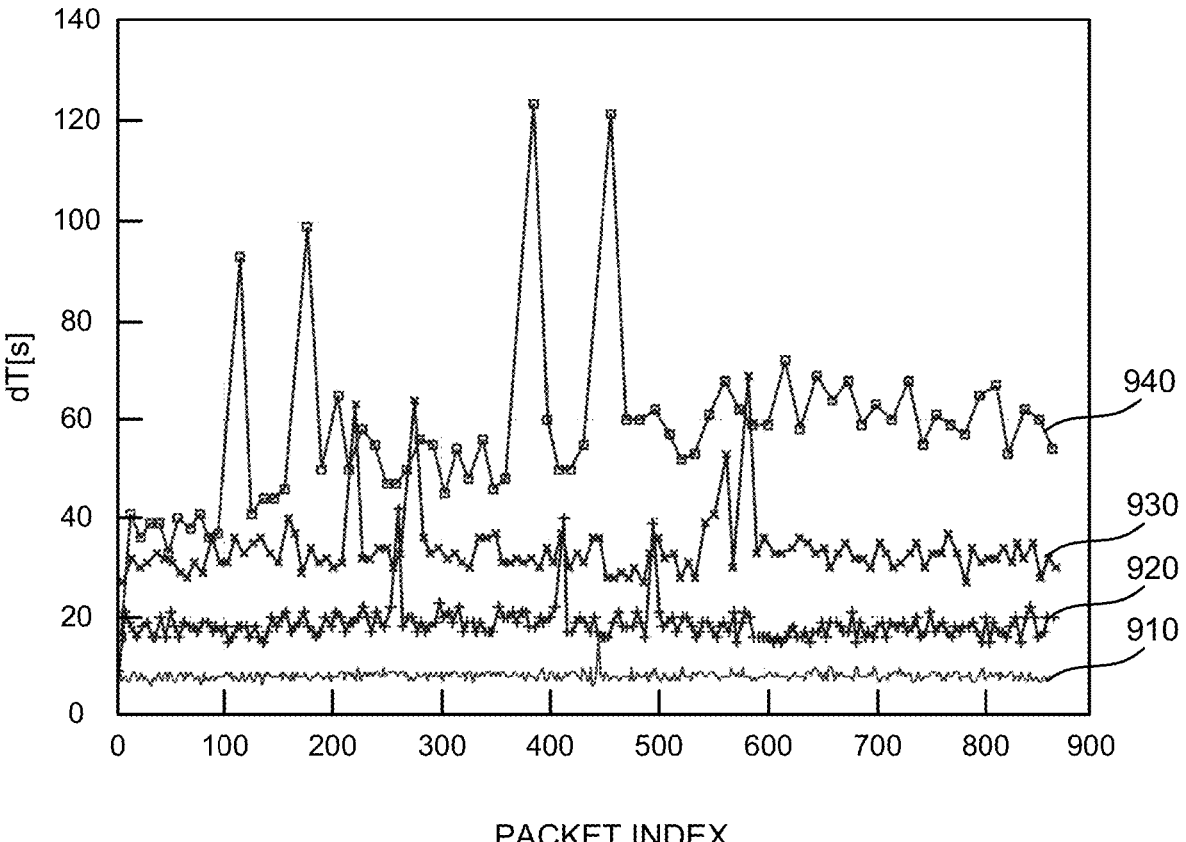
FIG. 9 illustrates observed inter-packet arrival times in a field test example, according to aspects of the disclosure.

FIG. 9 illustrates observed inter-packet arrival times in a field test example, according to aspects of the disclosure. In this example, four RFID tags were tested, including a first RFID tag having a distance of 5.6 m from a RFID station, a second RFID tag having a distance of 5.9 meters (m) from the RFID station, a third RFID tag having a distance of 6.5 m from the RFID station, and a fourth RFID tag having a distance of 6.7 m from the RFID station. In FIG. 9, the horizontal axis represents the packet indices (labeled as "PACKET INDEX"), and the vertical axis represents the inter-packet arrival times (which corresponds to the time difference between two packets and labeled as dT [s] in units of seconds(s)). Also, line 910 represents the inter-packet arrival times of the packets from the first RFID tag (with a mean dT=8.15 s), line 920 represents the inter-packet arrival times of the packets from the second RFID tag (with a mean dT=18.12 s), line 930 represents the inter-packet arrival times of the packets from the third RFID tag (with a mean dT=33.44 s), and line 940 represents the inter-packet arrival times of the packets from the fourth RFID tag (with a mean dT=56.25 s).

As shown in FIG. 9, in the field test example, the inter-packet arrival times may be correlated with the distances between the RFID tags and the RFID station. In some aspects, the inter-packet arrival time may be indicative of the received RSSI. In some aspects, an RFID station may use the inter-packet arrival time (i.e., dT) from an RFID tag, alone or in addition to using a reported RSSI, for estimating the distance of the RFID tag. In some aspects, the RFID station may maintain a mapping of dT to RSSI depending on the RFID tag-side energy harvesting capability information and configurations. In some aspects, the RFID station may maintain a mapping of dT to distance/positioning based on learning/calibration with RFID tags at known positions.

In some aspects, the RFID station may determine the mapping relationship based on capability information of the RFID tag that includes an energy harvesting efficiency characteristic of the RFID tag, a power consumption level for sending the a packet by the RFID tag, an accuracy of monitoring an energy level of an energy storage device of the RFID tag by the RFID tag, an accuracy of monitoring a signal strength of radio frequency waves from the RFID station by the RFID tag, or a combination thereof. In some aspects, the RFID station may update or calibrate the mapping relationship based on one or more training packets from one or more training devices at one or more known locations.

Moreover, in some aspects, for enabling the use of inter-packet arrival times to distance/position estimation of an RFID tag, an RFID station may need to know the energy harvester characteristics (e.g., RSSI versus energy harvesting efficiency), power consumption for transmitting the packet, and/or whether the RFID tag is configured to continuously transmitting the packets whenever the stored power is sufficient. In some aspects, there may be no accumulation of energy in the energy storage device beyond the configured level.

In some aspects, the RFID station may continuously (at least from the first arrival time $T_3$ to the second arrival time $T_6$ in FIG. 8) transmit radio frequency waves to energize the RFID tag.

In some aspects, as shown in FIG. 8, the first timing diagram 800A illustrates a set of operations that includes an energy harvesting operation to charge the energy storage device (e.g., from time $T_2$ to time $T_4$) and a packet sending operation to send a corresponding packet based on the energy level of the energy storage device reaching the configured level (e.g., from time $T_4$ to time $T_5$), where the energy level of the energy storage device may be reset as a result of the corresponding packet being transmitted (e.g., at time $T_5$). In some aspects, the RFID tag may continuously repeat the above-noted set of operations.

In some aspects, the RFID tag may transmit the first packet and the second packet based on active transmission, and the RFID station may receive the first packet and second packet via the active transmission from the RFID tag.

In some aspects, the energy storage device may include a battery or a supercapacitor. In some aspects, the RFID tag may store at least a first portion of the harvested energy in the battery, store at least a second portion of the harvested energy in the supercapacitor, or both.

In some aspects, the RFID tag may include additional data in the first packet and/or the second packet. For example, the RFID tag may include first sensor data of one or more sensors of the RFID tag in the first packet, second sensor data of the one or more sensors of the RFID tag in the second packet, or a combination thereof. In some aspects, the one or more sensors may include sensors that measures temperature, humidity, and/or ambient illuminance.

In some aspects, the energy level of the energy storage device reaching the configured level corresponds to the energy storage device having stored a configured amount of energy to power the RFID tag to send the second packet after the first packet being transmitted.

In some aspects, the RFID tag may report, to the RFID station, capability information of the RFID tag. In some aspects, the capability information may include an energy harvesting efficiency characteristic of the RFID tag, a power consumption level for sending the first packet or the second packet by the RFID tag, an accuracy of monitoring the energy level of the energy storage device by the RFID tag, an accuracy of monitoring a signal strength of the radio frequency waves from the RFID station by the RFID tag, or a combination thereof. In some aspects, the RFID station may transmit a capability inquiry to the RFID tag, and the capability information may be reported by the RFID tag based on the capability inquiry.

In some aspects, the RFID station may transmit, and RFID tag may receive, configuration information with respect to at least transmission of the first packet and/or transmission of the second packet. In some aspects, the configuration information may indicate: the configured level; a start time, an end time, or a duration of a time period during which the radio frequency waves from the RFID station for energy harvesting are continuously transmitted; or a combination thereof. In some aspects, the RFID station may determine the configured level, determine the start time, the end time, or the duration of the time period, or both, based on the capability information of the RFID tag.

In some aspects, the RFID tag capability regarding monitoring the energy level of the energy storage device may be reported to the RFID station for determining the accuracy of the positioning based on the inter-arrival times. For example, if the RSSI/voltage monitoring circuit in an RFID tag may tolerate an error of X %, the accuracy of the estimated position may have an uncertainty of at least X % (e.g., X may be 1 or 10).

FIG. 10 illustrates an example method 1000 of operating an RFID station, according to aspects of the disclosure. In an aspect, method 1000 may be performed by an RFID station that may correspond to any of the RFID station described in this disclosure. In some aspects, the RFID station may be a TRP or a UE, such as any TRP or UE described in this disclosure.

At operation 1010, the RFID station can receive a first packet from an RFID tag at a first arrival time. In some aspects, operation 1010 may correspond to the operation as illustrated with reference to block 826 at a first arrival time $T_3$ in FIG. 8. In some aspects, the first packet may be received via active transmission from the RFID tag.

In an aspect, operation 1010 may be performed by the RFID station 510. In an aspect, operation 1010 may be performed by the one or more WWAN transceivers 450, the one or more short-range wireless transceivers 460, the one or more processors 484, memory 486, and/or RFID component 488, any or all of which may be considered means for performing this operation. In an aspect, operation 1010 may be performed by the one or more WWAN transceivers 410, the one or more short-range wireless transceivers 420, the one or more processors 432, memory 440, and/or RFID component 442, any or all of which may be considered means for performing this operation.

At operation 1020, the RFID station can receive a second packet from the RFID tag at a second arrival time after the first arrival time. In some aspects, operation 1020 may correspond to the operation as illustrated with reference to block 836 at a second arrival time $T_6$ in FIG. 8. In some aspects, the second packet may be received via active transmission from the RFID tag.

In an aspect, operation 1020 may be performed by the one or more WWAN transceivers 450, the one or more short-range wireless transceivers 460, the one or more processors 484, memory 486, and/or RFID component 488, any or all of which may be considered means for performing this operation. In an aspect, operation 1020 may be performed by the one or more WWAN transceivers 410, the one or more short-range wireless transceivers 420, the one or more processors 432, memory 440, and/or RFID component 442, any or all of which may be considered means for performing this operation.

At operation 1030, the RFID station can estimate a distance between the RFID station and the RFID tag based on an inter-packet arrival time between the first packet and the second packet, the inter-packet arrival time being based on a time difference between the first arrival time and the second arrival time. In some aspects, the time difference between the first arrival time and the second arrival time in operation 1030 may correspond to the time difference labeled as dT in FIG. 8.

In an aspect, operation 1030 may be performed by the one or more WWAN transceivers 450, the one or more short-range wireless transceivers 460, the one or more processors 484, memory 486, and/or RFID component 488, any or all of which may be considered means for performing this operation. In an aspect, operation 1030 may be performed by the one or more WWAN transceivers 410, the one or more short-range wireless transceivers 420, the one or more processors 432, memory 440, and/or RFID component 442, any or all of which may be considered means for performing this operation.

In some aspect, the RFID station may further transmit radio frequency waves to energize the RFID tag. In some aspects, the radio frequency waves may be transmitted continuously at least from the first arrival time to the second arrival time.

In some aspects, the distance between the RFID station and the RFID tag may be estimated based on a mapping relationship between different possible inter-packet arrival times and respective estimated distance values. In some aspects, the RFID station may determine the mapping relationship based on capability information of the RFID tag that may include: an energy harvesting efficiency characteristic of the RFID tag; a power consumption level for sending the first packet or the second packet by the RFID tag; an accuracy of monitoring an energy level of an energy storage device of the RFID tag by the RFID tag; an accuracy of monitoring a signal strength of radio frequency waves from the RFID station by the RFID tag; or a combination thereof. In some aspects, the RFID station may further update or calibrate the mapping relationship based on one or more training packets from one or more training devices at one or more known locations.

In some aspects, the RFID station may further send, to the RFID tag, configuration information regarding at least transmission of the second packet. In some aspects, the configuration information may indicate: a configured level of an energy level of an energy storage device of the RFID tag corresponding to the energy storage device having stored a configured amount of energy to power the RFID tag to transmit the second packet after the first packet being transmitted; a start time, an end time, or a duration of a time period during which radio frequency waves from the RFID station for energy harvesting are continuously transmitted; or a combination thereof.

In some aspects, the RFID station may receive capability information of the RFID tag. In some aspects, the RFID station may determine the configured level, may determine the start time, the end time, or the duration of the time period, or both, based on the capability information of the RFID tag. In some aspects, the capability information of the RFID tag may indicate: an energy harvesting efficiency characteristic of the RFID tag; a power consumption level for sending the first packet or the second packet by the RFID tag; an accuracy of monitoring the energy level of the energy storage device by the RFID tag; an accuracy of monitoring a signal strength of radio frequency waves from the RFID station by the RFID tag; or a combination thereof.

In some aspects, the RFID station may transmit a capability inquiry to the RFID tag, and the capability information may be reported by the RFID tag based on the capability inquiry.

As will be appreciated, a technical advantage of the method 1000 is to simplify the hardware and/or processing complexity requirements at an RFID tag for a positioning estimation procedure that is based on an inter-packet arrival time. Accordingly, the RFID station may determine a distance between the RFID tag and the RFID station without imposing significant loading to the RFID tag and without significant processing latency.

FIG. 11 illustrates an example method 1100 of operating an RFID tag, according to aspects of the disclosure. In an aspect, method 1100 may be performed by an RFID tag that may correspond to any of the RFID tag described in this disclosure. In some aspects, the RFID tag may be embedded in or integrally formed with a UE, such as any UE described in this disclosure.

At operation 1110, the RFID tag can transmit a first packet to an RFID station at a first transmission time. In some aspects, an energy level of an energy storage device of the RFID tag may be reset as a result of the first packet being transmitted. In some aspects, operation 1110 may correspond to the operation as illustrated with reference to block 822 at a first transmission time $T_1$ in FIG. 8, where the energy level of the energy storage device of the RFID tag may be reset to a reset level as illustrated in FIG. 8. In some aspects, the transmission of the first packet may be performed based on active transmission from the RFID tag.

In an aspect, operation 1110 may be performed by the RFID tag 530. In an aspect, operation 1110 may be performed by the one or more WWAN transceivers 410, the one or more short-range wireless transceivers 420, the one or more processors 432, memory 440, and/or RFID component 442, any or all of which may be considered means for performing this operation.

At operation 1120, the RFID tag can harvest energy at least based on radio frequency waves from the RFID station after the first packet being transmitted, and can store the harvested energy in the energy storage device. In some aspects, operation 1120 may correspond to the operation as illustrated in FIG. 8 at least from time $T_2$ to time $T_4$. In some aspects, the RFID tag can store at least a first portion of the harvested energy in a battery, can store at least a second portion of the harvested energy in a supercapacitor, or a combination thereof.

In an aspect, operation 1120 may be performed by the RFID tag 530. In an aspect, operation 1120 may be performed by the one or more WWAN transceivers 410, the one or more short-range wireless transceivers 420, the one or more processors 432, memory 440, and/or RFID component 442, any or all of which may be considered means for performing this operation.

At operation 1130, the RFID tag can transmit, based on the energy level of the energy storage device reaching a configured level, a second packet to the RFID station at a second transmission time after the first transmission time to enable the RFID station to determine an inter-packet arrival time between the first packet and the second packet. In some aspects, operation 1130 may correspond to the operation as illustrated with reference to block 832 at a second transmission time $T_4$ in FIG. 8, where the energy level of the energy storage device of the RFID tag may reach a configured level at time $T_4$ as illustrated in FIG. 8. In some aspects, the transmission of the second packet may be performed based on active transmission from the RFID tag.

In some aspects, the energy level of the energy storage device reaching the configured level may correspond to the energy storage device having stored a configured amount of energy to power the RFID tag to send the second packet after the first packet being transmitted.

In an aspect, operation 1130 may be performed by the RFID tag 530. In an aspect, operation 1130 may be performed by the one or more WWAN transceivers 410, the one or more short-range wireless transceivers 420, the one or more processors 432, memory 440, and/or RFID component 442, any or all of which may be considered means for performing this operation.

In some aspects, the RFID tag may include first sensor data of one or more sensors of the RFID tag in the first packet, may include second sensor data of the one or more sensors of the RFID tag in the second packet, or a combination thereof. In some aspects, the RFID tag may continuously repeat a set of operations that includes an energy harvesting operation to charge the energy storage device, and a packet sending operation to send a corresponding packet based on the energy level of the energy storage device reaching the configured level, the energy level of the energy storage device being reset as a result of the corresponding packet being transmitted.

In some aspects, the RFID tag may report, to the RFID station, capability information of the RFID tag. In some aspects, the capability information may include: an energy harvesting efficiency characteristic of the RFID tag; a power consumption level for sending the first packet or the second packet by the RFID tag; an accuracy of monitoring the energy level of the energy storage device by the RFID tag; an accuracy of monitoring a signal strength of the radio frequency waves from the RFID station by the RFID tag; or a combination thereof. In some aspects, the RFID tag may receive a capability inquiry from the RFID station, and the RFID tag may report the capability information based on the capability inquiry from the RFID station.

In some aspects, the RFID tag may further receive configuration information from the RFID station. In some aspects, the configuration information may indicate: the configured level; a start time, an end time, or a duration of a time period during which the radio frequency waves from the RFID station for energy harvesting are continuously transmitted; or a combination thereof.

As will be appreciated, a technical advantage of the method 1100 is to simplify the hardware and/or processing complexity requirements at an RFID tag for a positioning estimation procedure that is based on an inter-packet arrival time. Accordingly, the RFID tag may engage in a positioning procedure without excessive hardware and/or processing demands, without significant processing latency, and hence without incurring excessive power consumption.

In the detailed description above it can be seen that different features are grouped together in examples. This manner of disclosure should not be understood as an intention that the example clauses have more features than are explicitly mentioned in each clause. Rather, the various aspects of the disclosure may include fewer than all features of an individual example clause disclosed. Therefore, the following clauses should hereby be deemed to be incorporated in the description, wherein each clause by itself can stand as a separate example. Although each dependent clause can refer in the clauses to a specific combination with one of the other clauses, the aspect(s) of that dependent clause are not limited to the specific combination. It will be appreciated that other example clauses can also include a combination of the dependent clause aspect(s) with the subject matter of any other dependent clause or independent clause or a combination of any feature with other dependent and independent clauses. The various aspects disclosed herein expressly include these combinations, unless it is explicitly expressed or can be readily inferred that a specific combination is not intended (e.g., contradictory aspects, such as defining an element as both an electrical insulator and an electrical conductor). Furthermore, it is also intended that aspects of a clause can be included in any other independent clause, even if the clause is not directly dependent on the independent clause.

Implementation examples are described in the following numbered clauses:

Clause 1. A method of operating a radio frequency identification (RFID) station, the method comprising: receiving a first packet from an RFID tag at a first arrival time; receiving a second packet from the RFID tag at a second arrival time after the first arrival time; and estimating a distance between the RFID station and the RFID tag based on an inter-packet arrival time between the first packet and the second packet, the inter-packet arrival time being based on a time difference between the first arrival time and the second arrival time.

Clause 2. The method of clause 1, further comprising transmitting radio frequency waves to energize the RFID tag.

Clause 3. The method of clause 2, wherein the radio frequency waves are transmitted continuously at least from the first arrival time to the second arrival time.

Clause 4. The method of any of clauses 1 to 3, wherein the receiving the first packet and the receiving the second packet are performed based on active transmission from the RFID tag.

Clause 5. The method of any of clauses 1 to 4, wherein the estimating the distance between the RFID station and the RFID tag is based on a mapping relationship between different possible inter-packet arrival times and respective estimated distance values.

Clause 6. The method of clause 5, further comprising determining the mapping relationship based on capability information of the RFID tag that includes: an energy harvesting efficiency characteristic of the RFID tag; a power consumption level for sending the first packet or the second packet by the RFID tag; an accuracy of monitoring an energy level of an energy storage device of the RFID tag by the RFID tag; an accuracy of monitoring a signal strength of radio frequency waves from the RFID station by the RFID tag; or a combination thereof.

Clause 7. The method of clause 6, further comprising updating or calibrating the mapping relationship based on one or more training packets from one or more training devices at one or more known locations.

Clause 8. The method of any of clauses 1 to 7, further comprising sending, to the RFID tag, configuration information regarding at least transmission of the second packet.

Clause 9. The method of clause 8, wherein the configuration information indicates: a configured level of an energy level of an energy storage device of the RFID tag corresponding to the energy storage device having stored a configured amount of energy to power the RFID tag to transmit the second packet after the first packet being transmitted; a start time, an end time, or a duration of a time period during which radio frequency waves from the RFID station for energy harvesting are continuously transmitted; or a combination thereof.

Clause 10. The method of clause 9, further comprising: receiving capability information of the RFID tag; and determining the configured level, determining the start time, the end time, or the duration of the time period, or both, based on the capability information of the RFID tag.

Clause 11. The method of clause 10, wherein the capability information of the RFID tag indicates: an energy harvesting efficiency characteristic of the RFID tag; a power consumption level for sending the first packet or the second packet by the RFID tag; an accuracy of monitoring the energy level of the energy storage device by the RFID tag; an accuracy of monitoring a signal strength of the radio frequency waves from the RFID station by the RFID tag; or a combination thereof.

Clause 12. The method of any of clauses 10 to 11, further comprising transmitting a capability inquiry to the RFID tag, wherein the capability information is reported by the RFID tag based on the capability inquiry.

Clause 13. A method of operating a radio frequency identification (RFID) tag, the method comprising: transmitting a first packet to an RFID station at a first transmission time, an energy level of an energy storage device of the RFID tag being reset as a result of the first packet being transmitted; harvesting energy at least based on radio frequency waves from the RFID station after the first packet being transmitted, and storing the harvested energy in the energy storage device; and transmitting, based on the energy level of the energy storage device reaching a configured level, a second packet to the RFID station at a second transmission time after the first transmission time to enable the RFID station to determine an inter-packet arrival time between the first packet and the second packet.

Clause 14. The method of clause 13, wherein the transmitting the first packet and the transmitting the second packet are performed based on active transmission.

Clause 15. The method of any of clauses 13 to 14, wherein the storing the harvested energy in the energy storage device comprises: storing at least a first portion of the harvested energy in a battery; storing at least a second portion of the harvested energy in a supercapacitor; or a combination thereof.

Clause 16. The method of any of clauses 13 to 15, wherein the energy level of the energy storage device reaching the configured level corresponds to the energy storage device having stored a configured amount of energy to power the RFID tag to send the second packet after the first packet being transmitted.

Clause 17. The method of any of clauses 13 to 16, further comprising: including first sensor data of one or more sensors of the RFID tag in the first packet; including second sensor data of the one or more sensors of the RFID tag in the second packet; or a combination thereof.

Clause 18. The method of any of clauses 13 to 17, further comprising continuously repeating a set of operations that includes: an energy harvesting operation to charge the energy storage device; and a packet sending operation to send a corresponding packet based on the energy level of the energy storage device reaching the configured level, the energy level of the energy storage device being reset as a result of the corresponding packet being transmitted.

Clause 19. The method of any of clauses 13 to 18, further comprising reporting, to the RFID station, capability information of the RFID tag that includes: an energy harvesting efficiency characteristic of the RFID tag; a power consumption level for sending the first packet or the second packet by the RFID tag; an accuracy of monitoring the energy level of the energy storage device by the RFID tag; an accuracy of monitoring a signal strength of the radio frequency waves from the RFID station by the RFID tag; or a combination thereof.

Clause 20. The method of clause 19, further comprising receiving a capability inquiry from the RFID station, wherein the reporting the capability information is based on the capability inquiry from the RFID station.

Clause 21. The method of any of clauses 13 to 20, further comprising receiving configuration information from the RFID station, the configuration information indicating: the configured level; a start time, an end time, or a duration of a time period during which the radio frequency waves from the RFID station for energy harvesting are continuously transmitted; or a combination thereof.

Clause 22. A radio frequency identification (RFID) station, comprising: at least one memory; at least one transceiver; and at least one processor communicatively coupled to the at least one memory and the at least one transceiver, the at least one processor configured to: receive, via the at least one transceiver, a first packet from an RFID tag at a first arrival time; receive, via the at least one transceiver, a second packet from the RFID tag at a second arrival time after the first arrival time; and estimate a distance between the RFID station and the RFID tag based on an inter-packet arrival time between the first packet and the second packet, the inter-packet arrival time being based on a time difference between the first arrival time and the second arrival time.

Clause 23. The RFID station of clause 22, wherein the at least one processor is further configured to transmit, via the at least one transceiver, radio frequency waves to energize the RFID tag.

Clause 24. The RFID station of clause 23, wherein the radio frequency waves are transmitted continuously at least from the first arrival time to the second arrival time.

Clause 25. The RFID station of any of clauses 22 to 24, wherein the first packet and the second packet are received based on active transmission from the RFID tag.

Clause 26. The RFID station of any of clauses 22 to 25, wherein the distance between the RFID station and the RFID tag are estimated based on a mapping relationship between different possible inter-packet arrival times and respective estimated distance values.

Clause 27. The RFID station of clause 26, wherein the at least one processor is further configured to determine the mapping relationship based on capability information of the RFID tag that includes: an energy harvesting efficiency characteristic of the RFID tag; a power consumption level for sending the first packet or the second packet by the RFID tag; an accuracy of monitoring an energy level of an energy storage device of the RFID tag by the RFID tag; an accuracy of monitoring a signal strength of radio frequency waves from the RFID station by the RFID tag; or a combination thereof.

Clause 28. The RFID station of clause 27, wherein the at least one processor is further configured to update or calibrate the mapping relationship based on one or more training packets from one or more training devices at one or more known locations.

Clause 29. The RFID station of any of clauses 22 to 28, wherein the at least one processor is further configured to send, via the at least one transceiver to the RFID tag, configuration information regarding at least transmission of the second packet.

Clause 30. The RFID station of clause 29, wherein the configuration information indicates: a configured level of an energy level of an energy storage device of the RFID tag corresponding to the energy storage device having stored a configured amount of energy to power the RFID tag to transmit the second packet after the first packet being transmitted; a start time, an end time, or a duration of a time period during which radio frequency waves from the RFID station for energy harvesting are continuously transmitted; or a combination thereof.

Clause 31. The RFID station of clause 30, wherein the at least one processor is further configured to: receive, via the at least one transceiver, capability information of the RFID tag; and determine the configured level, determine the start time, the end time, or the duration of the time period, or both, based on the capability information of the RFID tag.

Clause 32. The RFID station of clause 31, wherein the capability information of the RFID tag indicates: an energy harvesting efficiency characteristic of the RFID tag; a power consumption level for sending the first packet or the second packet by the RFID tag; an accuracy of monitoring the energy level of the energy storage device by the RFID tag; an accuracy of monitoring a signal strength of the radio frequency waves from the RFID station by the RFID tag; or a combination thereof.

Clause 33. The RFID station of any of clauses 31 to 32, wherein the at least one processor is further configured to transmit, via the at least one transceiver, a capability inquiry to the RFID tag, wherein the capability information is reported by the RFID tag based on the capability inquiry.

Clause 34. A radio frequency identification (RFID) tag, comprising: at least one memory; at least one transceiver; and at least one processor communicatively coupled to the at least one memory and the at least one transceiver, the at least one processor configured to: transmit, via the at least one transceiver, a first packet to an RFID station at a first transmission time, an energy level of an energy storage device of the RFID tag being reset as a result of the first packet being transmitted; harvest energy at least based on radio frequency waves from the RFID station after the first packet being transmitted, and storing the harvested energy in the energy storage device; and transmit, via the at least one transceiver and based on the energy level of the energy storage device reaching a configured level, a second packet to the RFID station at a second transmission time after the first transmission time to enable the RFID station to determine an inter-packet arrival time between the first packet and the second packet.

Clause 35. The RFID tag of clause 34, wherein the first packet and the second packet are transmitted based on active transmission.

Clause 36. The RFID tag of any of clauses 34 to 35, wherein the storing the harvested energy in the energy storage device comprises: store at least a first portion of the harvested energy in a battery; store at least a second portion of the harvested energy in a supercapacitor; or a combination thereof.

Clause 37. The RFID tag of any of clauses 34 to 36, wherein the energy level of the energy storage device reaching the configured level corresponds to the energy storage device having stored a configured amount of energy to power the RFID tag to send the second packet after the first packet being transmitted.

Clause 38. The RFID tag of any of clauses 34 to 37, wherein the at least one processor is further configured to: include first sensor data of one or more sensors of the RFID tag in the first packet; include second sensor data of the one or more sensors of the RFID tag in the second packet; or a combination thereof.

Clause 39. The RFID tag of any of clauses 34 to 38, wherein the at least one processor is further configured to continuously repeat a set of operations that includes: an energy harvesting operation to charge the energy storage device; and a packet sending operation to send a corresponding packet based on the energy level of the energy storage device reaching the configured level, the energy level of the energy storage device being reset as a result of the corresponding packet being transmitted.

Clause 40. The RFID tag of any of clauses 34 to 39, wherein the at least one processor is further configured to report, via the at least one transceiver to the RFID station, capability information of the RFID tag that includes: an energy harvesting efficiency characteristic of the RFID tag; a power consumption level for sending the first packet or the second packet by the RFID tag; an accuracy of monitoring the energy level of the energy storage device by the RFID tag; an accuracy of monitoring a signal strength of the radio frequency waves from the RFID station by the RFID tag; or a combination thereof.

Clause 41. The RFID tag of clause 40, wherein the at least one processor is further configured to receive, via the at least one transceiver, a capability inquiry from the RFID station, wherein the capability information is reported based on the capability inquiry from the RFID station.

Clause 42. The RFID tag of any of clauses 34 to 41, wherein the at least one processor is further configured to receive, via the at least one transceiver, configuration information from the RFID station, the configuration information indicating: the configured level; a start time, an end time, or a duration of a time period during which the radio frequency waves from the RFID station for energy harvesting are continuously transmitted; or a combination thereof.

Clause 43. A radio frequency identification (RFID) station, comprising: means for receiving a first packet from an RFID tag at a first arrival time; means for receiving a second packet from the RFID tag at a second arrival time after the first arrival time; and means for estimating a distance between the RFID station and the RFID tag based on an inter-packet arrival time between the first packet and the second packet, the inter-packet arrival time being based on a time difference between the first arrival time and the second arrival time.

Clause 44. The RFID station of clause 43, further comprising means for transmitting radio frequency waves to energize the RFID tag.

Clause 45. The RFID station of clause 44, wherein the radio frequency waves are transmitted continuously at least from the first arrival time to the second arrival time.

Clause 46. The RFID station of any of clauses 43 to 45, wherein the first packet and the second packet are received based on active transmission from the RFID tag.

Clause 47. The RFID station of any of clauses 43 to 46, wherein the distance between the RFID station and the RFID tag are estimated based on a mapping relationship between different possible inter-packet arrival times and respective estimated distance values.

Clause 48. The RFID station of clause 47, further comprising means for determining the mapping relationship based on capability information of the RFID tag that includes: an energy harvesting efficiency characteristic of the RFID tag; a power consumption level for sending the first packet or the second packet by the RFID tag; an accuracy of monitoring an energy level of an energy storage device of the RFID tag by the RFID tag; an accuracy of monitoring a signal strength of radio frequency waves from the RFID station by the RFID tag; or a combination thereof.

Clause 49. The RFID station of clause 48, further comprising means for updating or calibrating the mapping relationship based on one or more training packets from one or more training devices at one or more known locations.

Clause 50. The RFID station of any of clauses 43 to 49, further comprising means for sending, to the RFID tag, configuration information regarding at least transmission of the second packet.

Clause 51. The RFID station of clause 50, wherein the configuration information indicates: a configured level of an energy level of an energy storage device of the RFID tag corresponding to the energy storage device having stored a configured amount of energy to power the RFID tag to transmit the second packet after the first packet being transmitted; a start time, an end time, or a duration of a time period during which radio frequency waves from the RFID station for energy harvesting are continuously transmitted; or a combination thereof.

Clause 52. The RFID station of clause 51, further comprising: means for receiving capability information of the RFID tag; and means for determining the configured level, determining the start time, the end time, or the duration of the time period, or both, based on the capability information of the RFID tag.

Clause 53. The RFID station of clause 52, wherein the capability information of the RFID tag indicates: an energy harvesting efficiency characteristic of the RFID tag; a power consumption level for sending the first packet or the second packet by the RFID tag; an accuracy of monitoring the energy level of the energy storage device by the RFID tag; an accuracy of monitoring a signal strength of the radio frequency waves from the RFID station by the RFID tag; or a combination thereof.

Clause 54. The RFID station of any of clauses 52 to 53, further comprising means for transmitting a capability inquiry to the RFID tag, wherein the capability information is reported by the RFID tag based on the capability inquiry.

Clause 55. A radio frequency identification (RFID) tag, comprising: means for transmitting a first packet to an RFID station at a first transmission time, an energy level of an energy storage device of the RFID tag being reset as a result of the first packet being transmitted; means for harvesting energy at least based on radio frequency waves from the RFID station after the first packet being transmitted, and storing the harvested energy in the energy storage device; and means for transmitting, based on the energy level of the energy storage device reaching a configured level, a second packet to the RFID station at a second transmission time after the first transmission time to enable the RFID station to determine an inter-packet arrival time between the first packet and the second packet.

Clause 56. The RFID tag of clause 55, wherein the first packet and the second packet are transmitted based on active transmission.

Clause 57. The RFID tag of any of clauses 55 to 56, wherein the means for harvesting energy and storing the harvested energy in the energy storage device comprises: means for storing at least a first portion of the harvested energy in a battery; means for storing at least a second portion of the harvested energy in a supercapacitor; or a combination thereof.

Clause 58. The RFID tag of any of clauses 55 to 57, wherein the energy level of the energy storage device reaching the configured level corresponds to the energy storage device having stored a configured amount of energy to power the RFID tag to send the second packet after the first packet being transmitted.

Clause 59. The RFID tag of any of clauses 55 to 58, further comprising: means for including first sensor data of one or more sensors of the RFID tag in the first packet; means for including second sensor data of the one or more sensors of the RFID tag in the second packet; or a combination thereof.

Clause 60. The RFID tag of any of clauses 55 to 59, further comprising means for continuously repeating a set of operations that includes: an energy harvesting operation to charge the energy storage device; and a packet sending operation to send a corresponding packet based on the energy level of the energy storage device reaching the configured level, the energy level of the energy storage device being reset as a result of the corresponding packet being transmitted.

Clause 61. The RFID tag of any of clauses 55 to 60, further comprising means for reporting, to the RFID station, capability information of the RFID tag that includes: an energy harvesting efficiency characteristic of the RFID tag; a power consumption level for sending the first packet or the second packet by the RFID tag; an accuracy of monitoring the energy level of the energy storage device by the RFID tag; an accuracy of monitoring a signal strength of the radio frequency waves from the RFID station by the RFID tag; or a combination thereof.

Clause 62. The RFID tag of clause 61, further comprising means for receiving a capability inquiry from the RFID station, wherein the capability information is reported based on the capability inquiry from the RFID station.

Clause 63. The RFID tag of any of clauses 55 to 62, further comprising means for receiving configuration information from the RFID station, the configuration information indicating: the configured level; a start time, an end time, or a duration of a time period during which the radio frequency waves from the RFID station for energy harvesting are continuously transmitted; or a combination thereof.

Clause 64. A non-transitory computer-readable medium storing computer-executable instructions that, when executed by a radio frequency identification (RFID) station, cause the RFID station to: receive a first packet from an RFID tag at a first arrival time; receive a second packet from the RFID tag at a second arrival time after the first arrival time; and estimate a distance between the RFID station and the RFID tag based on an inter-packet arrival time between the first packet and the second packet, the inter-packet arrival time being based on a time difference between the first arrival time and the second arrival time.

Clause 65. The non-transitory computer-readable medium of clause 64, further comprising computer-executable instructions that, when executed by the RFID station, cause the RFID station to transmit radio frequency waves to energize the RFID tag.

Clause 66. The non-transitory computer-readable medium of clause 65, wherein the radio frequency waves are transmitted continuously at least from the first arrival time to the second arrival time.

Clause 67. The non-transitory computer-readable medium of any of clauses 64 to 66, wherein the first packet and the second packet are received based on active transmission from the RFID tag.

Clause 68. The non-transitory computer-readable medium of any of clauses 64 to 67, wherein the distance between the RFID station and the RFID tag are estimated based on a mapping relationship between different possible inter-packet arrival times and respective estimated distance values.

Clause 69. The non-transitory computer-readable medium of clause 68, further comprising computer-executable instructions that, when executed by the RFID station, cause the RFID station to determine the mapping relationship based on capability information of the RFID tag that includes: an energy harvesting efficiency characteristic of the RFID tag; a power consumption level for sending the first packet or the second packet by the RFID tag; an accuracy of monitoring an energy level of an energy storage device of the RFID tag by the RFID tag; an accuracy of monitoring a signal strength of radio frequency waves from the RFID station by the RFID tag; or a combination thereof.

Clause 70. The non-transitory computer-readable medium of clause 69, further comprising computer-executable instructions that, when executed by the RFID station, cause the RFID station to update or calibrate the mapping relationship based on one or more training packets from one or more training devices at one or more known locations.

Clause 71. The non-transitory computer-readable medium of any of clauses 64 to 70, further comprising computer-executable instructions that, when executed by the RFID station, cause the RFID station to send, to the RFID tag, configuration information regarding at least transmission of the second packet.

Clause 72. The non-transitory computer-readable medium of clause 71, wherein the configuration information indicates: a configured level of an energy level of an energy storage device of the RFID tag corresponding to the energy storage device having stored a configured amount of energy to power the RFID tag to transmit the second packet after the first packet being transmitted; a start time, an end time, or a duration of a time period during which radio frequency waves from the RFID station for energy harvesting are continuously transmitted; or a combination thereof.

Clause 73. The non-transitory computer-readable medium of clause 72, further comprising computer-executable instructions that, when executed by the RFID station, cause the RFID station to: receive capability information of the RFID tag; and determine the configured level, determine the start time, the end time, or the duration of the time period, or both, based on the capability information of the RFID tag.

Clause 74. The non-transitory computer-readable medium of clause 73, wherein the capability information of the RFID tag indicates: an energy harvesting efficiency characteristic of the RFID tag; a power consumption level for sending the first packet or the second packet by the RFID tag; an accuracy of monitoring the energy level of the energy storage device by the RFID tag; an accuracy of monitoring a signal strength of the radio frequency waves from the RFID station by the RFID tag; or a combination thereof.

Clause 75. The non-transitory computer-readable medium of any of clauses 73 to 74, further comprising computer-executable instructions that, when executed by the RFID station, cause the RFID station to transmit a capability inquiry to the RFID tag, wherein the capability information is reported by the RFID tag based on the capability inquiry.

Clause 76. A non-transitory computer-readable medium storing computer-executable instructions that, when executed by a radio frequency identification (RFID) tag, cause the RFID tag to: transmit a first packet to an RFID station at a first transmission time, an energy level of an energy storage device of the RFID tag being reset as a result of the first packet being transmitted; harvest energy at least based on radio frequency waves from the RFID station after the first packet being transmitted, and storing the harvested energy in the energy storage device; and transmit, based on the energy level of the energy storage device reaching a configured level, a second packet to the RFID station at a second transmission time after the first transmission time to enable the RFID station to determine an inter-packet arrival time between the first packet and the second packet.

Clause 77. The non-transitory computer-readable medium of clause 76, wherein the first packet and the second packet are transmitted based on active transmission.

Clause 78. The non-transitory computer-readable medium of any of clauses 76 to 77, wherein the storing the harvested energy in the energy storage device comprises: store at least a first portion of the harvested energy in a battery; store at least a second portion of the harvested energy in a supercapacitor; or a combination thereof.

Clause 79. The non-transitory computer-readable medium of any of clauses 76 to 78, wherein the energy level of the energy storage device reaching the configured level corresponds to the energy storage device having stored a configured amount of energy to power the RFID tag to send the second packet after the first packet being transmitted.

Clause 80. The non-transitory computer-readable medium of any of clauses 76 to 79, further comprising com-puter-executable instructions that, when executed by the RFID tag, cause the RFID tag to: include first sensor data of one or more sensors of the RFID tag in the first packet; include second sensor data of the one or more sensors of the RFID tag in the second packet; or a combination thereof.

Clause 81. The non-transitory computer-readable medium of any of clauses 76 to 80, further comprising com-puter-executable instructions that, when executed by the RFID tag, cause the RFID tag to continuously repeat a set of operations that includes: an energy harvesting operation to charge the energy storage device; and a packet sending operation to send a corresponding packet based on the energy level of the energy storage device reaching the configured level, the energy level of the energy storage device being reset as a result of the corresponding packet being transmitted.

Clause 82. The non-transitory computer-readable medium of any of clauses 76 to 81, further comprising com-puter-executable instructions that, when executed by the RFID tag, cause the RFID tag to report, to the RFID station, capability information of the RFID tag that includes: an energy harvesting efficiency characteristic of the RFID tag; a power consumption level for sending the first packet or the second packet by the RFID tag; an accuracy of monitoring the energy level of the energy storage device by the RFID tag; an accuracy of monitoring a signal strength of the radio frequency waves from the RFID station by the RFID tag; or a combination thereof.

Clause 83. The non-transitory computer-readable medium of clause 82, further comprising computer-executable instructions that, when executed by the RFID tag, cause the RFID tag to receive a capability inquiry from the RFID station, wherein the capability information is reported based on the capability inquiry from the RFID station.

Clause 84. The non-transitory computer-readable medium of any of clauses 76 to 83, further comprising com-puter-executable instructions that, when executed by the RFID tag, cause the RFID tag to receive configu-ration information from the RFID station, the configu-ration information indicating: the configured level; a start time, an end time, or a duration of a time period during which the radio frequency waves from the RFID station for energy harvesting are continuously trans-mitted; or a combination thereof.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, elec-tromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hard-ware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a digital signal processor (DSP), an ASIC, a field-programable gate array (FPGA), or other programmable logic device, discrete gate or transistor logic, discrete hardware components, or any combination thereof designed to perform the functions described herein. A gen-eral-purpose processor may be a microprocessor, but in the alternative, the processor may be any conventional proces-sor, controller, microcontroller, or state machine. A proces-sor may also be implemented as a combination of computing devices, for example, a combination of a DSP and a micro-processor, a plurality of microprocessors, one or more microprocessors in conjunction with a DSP core, or any other such configuration.

The methods, sequences and/or algorithms described in connection with the aspects disclosed herein may be embod-ied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An example storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more example aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and micro-wave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method of operating a radio frequency identification (RFID) station, the method comprising:
   receiving a first packet from an RFID tag at a first arrival time;
   receiving a second packet from the RFID tag at a second arrival time after the first arrival time;
   determining a mapping relationship based on capability information of the RFID tag that includes:
       an energy harvesting efficiency characteristic of the RFID tag;
       a power consumption level for sending the first packet or the second packet by the RFID tag;
       an accuracy of monitoring an energy level of an energy storage device of the RFID tag by the RFID tag;
       an accuracy of monitoring a signal strength of radio frequency waves from the RFID station by the RFID tag; or
       a combination thereof; and
   estimating a distance between the RFID station and the RFID tag based on an inter-packet arrival time between the first packet and the second packet and the mapping relationship, the inter-packet arrival time being based on a time difference between the first arrival time and the second arrival time.

2. The method of claim 1, further comprising transmitting radio frequency waves to energize the RFID tag.

3. The method of claim 2, wherein the radio frequency waves are transmitted continuously at least from the first arrival time to the second arrival time.

4. The method of claim 1, wherein the receiving the first packet and the receiving the second packet are performed based on active transmission from the RFID tag.

5. The method of claim 1, further comprising updating or calibrating the mapping relationship based on one or more training packets from one or more training devices at one or more known locations.

6. The method of claim 1, further comprising sending, to the RFID tag, configuration information regarding at least transmission of the second packet.

7. The method of claim 6, wherein the configuration information indicates:
   a configured level of an energy level of an energy storage device of the RFID tag corresponding to the energy storage device having stored a configured amount of energy to power the RFID tag to transmit the second packet after the first packet being transmitted;
   a start time, an end time, or a duration of a time period during which radio frequency waves from the RFID station for energy harvesting are continuously trans-mitted; or
   a combination thereof.

8. The method of claim 7, further comprising:
   receiving capability information of the RFID tag; and
   determining the configured level, determining the start time, the end time, or the duration of the time period, or both, based on the capability information of the RFID tag.

9. The method of claim 8, wherein the capability information of the RFID tag indicates:
   an energy harvesting efficiency characteristic of the RFID tag;
   a power consumption level for sending the first packet or the second packet by the RFID tag;
   an accuracy of monitoring the energy level of the energy storage device by the RFID tag;
   an accuracy of monitoring a signal strength of the radio frequency waves from the RFID station by the RFID tag; or
   a combination thereof.

10. The method of claim 8, further comprising transmit-ting a capability inquiry to the RFID tag, wherein the capability information is reported by the RFID tag based on the capability inquiry.

11. A radio frequency identification (RFID) station, comprising:
   at least one memory;
   at least one transceiver; and
   at least one processor communicatively coupled to the at least one memory and the at least one transceiver, the at least one processor configured to:
   receive, via the at least one transceiver, a first packet from an RFID tag at a first arrival time;
   receive, via the at least one transceiver, a second packet from the RFID tag at a second arrival time after the first arrival time;
   determine a mapping relationship based on capability information of the RFID tag that includes:

51 an energy harvesting efficiency characteristic of the RFID tag;

a power consumption level for sending the first packet or the second packet by the RFID tag;

an accuracy of monitoring an energy level of an energy storage device of the RFID tag by the RFID tag;

an accuracy of monitoring a signal strength of radio frequency waves from the RFID station by the RFID tag; or a combination thereof; and estimate a distance between the RFID station and the RFID tag based on an inter-packet arrival time between the first packet and the second packet and the mapping relationship, the inter-packet arrival time being based on a time difference between the first arrival time and the second arrival time.

12. The RFID station of claim 11, wherein the at least one processor is further configured to transmit, via the at least one transceiver, radio frequency waves to energize the RFID tag.

13. The RFID station of claim 11, wherein the at least one processor is further configured to send, via the at least one transceiver to the RFID tag, configuration information regarding at least transmission of the second packet.

* * * * *

52